US012570409B2

(12) United States Patent
Michael et al.

(10) Patent No.: US 12,570,409 B2
(45) Date of Patent: Mar. 10, 2026

(54) METHODS FOR DETERMINING LIKELIHOODS OF IGNITION HAZARDS

(71) Applicant: The Boeing Company, Arlington, VA (US)

(72) Inventors: Louisa Michael, Ladson, SC (US); Derek Russell Tuck, North Charleston, SC (US); Hunter Blake Johnston, Atlanta, GA (US); Philipp Andreas Boettcher, Golden, CO (US)

(73) Assignee: The Boeing Company, Arlington, VA (US)

( * ) Notice: Subject to any disclaimer, the term of this patent is extended or adjusted under 35 U.S.C. 154(b) by 36 days.

(21) Appl. No.: 18/531,335

(22) Filed: Dec. 6, 2023

(65) Prior Publication Data

US 2025/0187748 A1     Jun. 12, 2025

(51) Int. Cl.
B64D 45/00          (2006.01)
(52) U.S. Cl.
CPC ...... B64D 45/00 (2013.01); B64D 2045/0085 (2013.01); B64D 2045/009 (2013.01)
(58) Field of Classification Search
CPC ............ B64D 45/00; B64D 2045/0085; B64D 2045/009
See application file for complete search history.

(56) References Cited

U.S. PATENT DOCUMENTS

| | | | |
|---|---|---|---|
| 2016/0047734 A1* | 2/2016 | Mills ..................... | G01N 27/00 |
| | | | 73/19.07 |
| 2020/0097624 A1* | 3/2020 | Westin ................... | G06F 30/23 |
| 2020/0213012 A1* | 7/2020 | Laughlin ............. | G01M 5/0016 |
| 2023/0062266 A1* | 3/2023 | Boettcher .............. | G06F 30/23 |

OTHER PUBLICATIONS

Michael, L. et al., "Lightning-induced degradation of fastened composite systems," Proceedings of the American Society for Composites Conference, Sep. 19, 2022, Tucson, AZ, 5 pages.
Tuck, D et al., "Model Validation of Lightning A—waveform Edge Attachment on Flat Panels, for Application to 787 Movable Trailing Edge Allowable Damage Limit Simulations.," Boeing Research & Technology Australia, Nov. 16, 2022, 149 pages.
European Patent Office, Extended European Search Report Issued in Application No. 24198157.0, Mar. 10, 2025, Germany, 8 pages.

(Continued)

*Primary Examiner* — Courtney D Heinle
(74) *Attorney, Agent, or Firm* — Alleman Hall LLP

(57) ABSTRACT

A method is presented for determining a likelihood of an ignition hazard. The method comprises receiving a current waveform for a lightning strike event at a conductive member that forms an interface with a decomposable member. Material parameter inputs for the conductive member and the decomposable member are received. Based at least on one or more of the received material parameter inputs and an energy from the current waveform, a heating of the decomposable member is resolved, and a quantity of volatiles within the interface volume are determined. A total pressure generation within the interface volume is determined. A probability of ignition hazard by the lightning strike event is output based on a comparison of the total pressure generation and a containment pressure threshold for the interface volume.

20 Claims, 17 Drawing Sheets

212

(56) References Cited

OTHER PUBLICATIONS

Tian, X. et al., "Study on the Factors Influencing the Damage Modes of Carbon Fiber-Reinforced Polymer Composites with a Fastener Under Lightning Strike Conditions," Applied Composite Materials, vol. 29, No. 2, Nov. 9, 2021, 17 pages.

Yu, S. et al., "Prediction Model of Gas Expansion and Electro-Thermal Coupling regarding Lightning Damage to Carbon Fiber Composites," Applied Composite Materials, vol. 28, No. 4, May 21, 2021, 16 pages.

Evans, S., "Characterisation of Outgassing From Carbon Fibre Composite Aircraft Joints Subjected to Lightning Current," Thesis, School of Engineering, Cardiff University, Jul. 1, 2018, 254 pages.

* cited by examiner

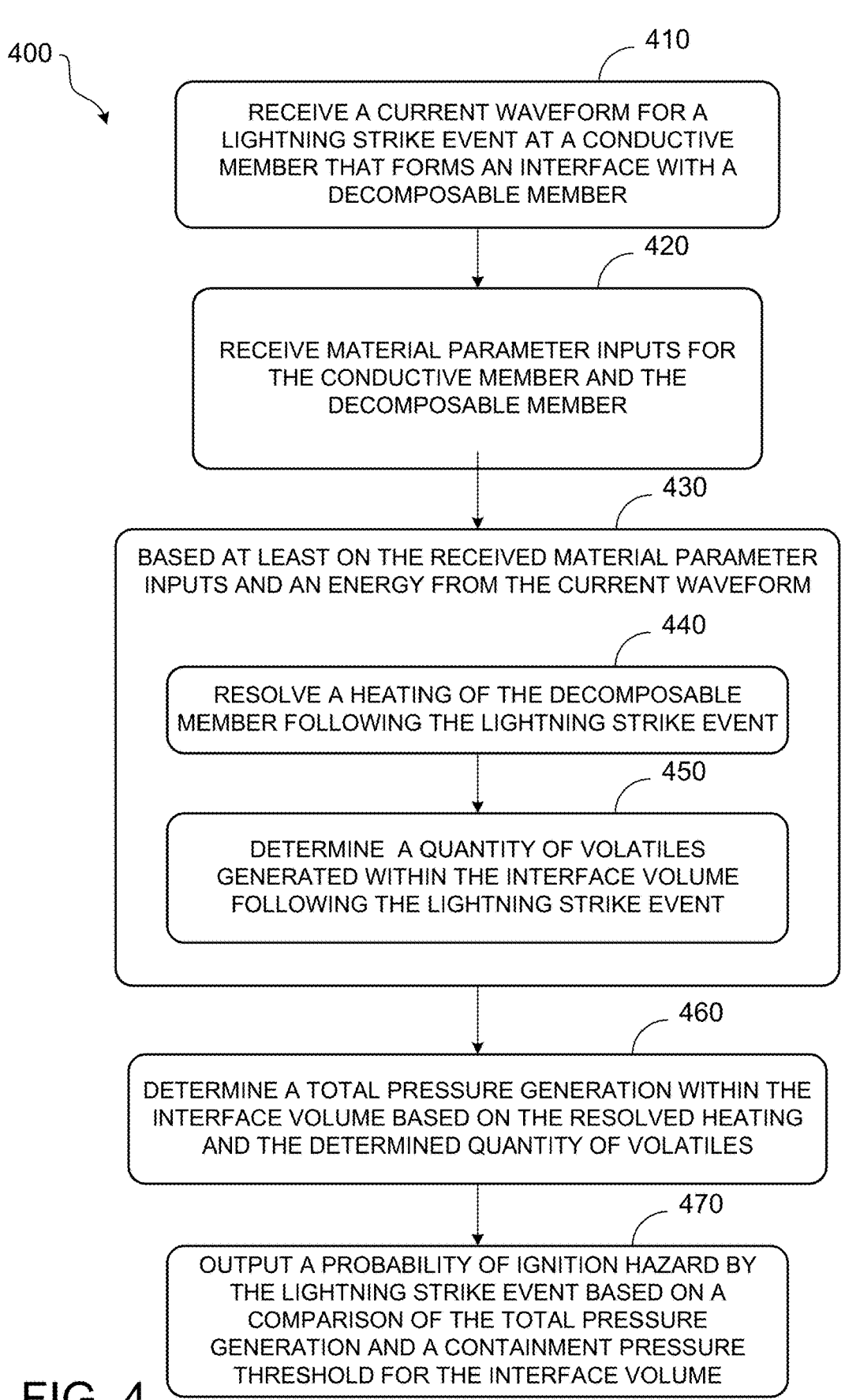

400

410

RECEIVE A CURRENT WAVEFORM FOR A LIGHTNING STRIKE EVENT AT A CONDUCTIVE MEMBER THAT FORMS AN INTERFACE WITH A DECOMPOSABLE MEMBER

420

RECEIVE MATERIAL PARAMETER INPUTS FOR THE CONDUCTIVE MEMBER AND THE DECOMPOSABLE MEMBER

430

BASED AT LEAST ON THE RECEIVED MATERIAL PARAMETER INPUTS AND AN ENERGY FROM THE CURRENT WAVEFORM

440

RESOLVE A HEATING OF THE DECOMPOSABLE MEMBER FOLLOWING THE LIGHTNING STRIKE EVENT

450

DETERMINE A QUANTITY OF VOLATILES GENERATED WITHIN THE INTERFACE VOLUME FOLLOWING THE LIGHTNING STRIKE EVENT

460

DETERMINE A TOTAL PRESSURE GENERATION WITHIN THE INTERFACE VOLUME BASED ON THE RESOLVED HEATING AND THE DETERMINED QUANTITY OF VOLATILES

470

OUTPUT A PROBABILITY OF IGNITION HAZARD BY THE LIGHTNING STRIKE EVENT BASED ON A COMPARISON OF THE TOTAL PRESSURE GENERATION AND A CONTAINMENT PRESSURE THRESHOLD FOR THE INTERFACE VOLUME

FIG. 4

METHODS FOR DETERMINING LIKELIHOODS OF IGNITION HAZARDS

FIELD

This disclosure relates to the field of aircraft. In particular, the disclosure relates to mitigating the effects of lightning strikes at interfaces between conductive members and decomposable members.

BACKGROUND

Aircraft can be made using lightweight materials in order to optimize performance and fuel economy. For some aircraft, such lightweight materials include carbon fiber reinforced plastics (CFRPs), in which strong, lightweight fibers are immobilized in a cured resin matrix. Carbon fibers are especially suitable for fiber-composite airframe components, such as panels. Compared with aluminum alloys conventionally used in aircraft and aerospace construction, CFRP provides a structure that is strong and lightweight. However, since CFRP-based panels have low conductivity, high levels of current from a lightning strike may be undesirably concentrated where two panels are joined together by a metal fastener.

SUMMARY

A method is presented for determining a likelihood of an ignition hazard. The method comprises receiving a current waveform for a lightning strike event at a conductive member that forms an interface with a decomposable member. Material parameter inputs for the conductive member and the decomposable member are received. Based at least on one or more of the received material parameter inputs, and an energy from the current waveform, a heating of the decomposable member is resolved, and a quantity of volatiles within the interface volume are determined. A total pressure generation within the interface volume is determined. A probability of ignition hazard by the lightning strike event is output based on a comparison of the total pressure generation and a containment pressure threshold for the interface volume.

BRIEF DESCRIPTION OF THE DRAWINGS

FIG. 4 shows a flow-diagram for an example method of determining a likelihood of an ignition hazard.

DETAILED DESCRIPTION

In flammable environments, lightning strikes on fastened composite structures can lead to ignition hazards that are often observed as light/sparking emission. Assessing new fastening systems, components or configurations for this sparking risk is generally done through large testing matrices, which is costly and time-consuming. The ability to instead reliably model these ignition hazards could reduce costs and lead times normally associated with testing for new fastening systems and failure modes.

Figure 1:
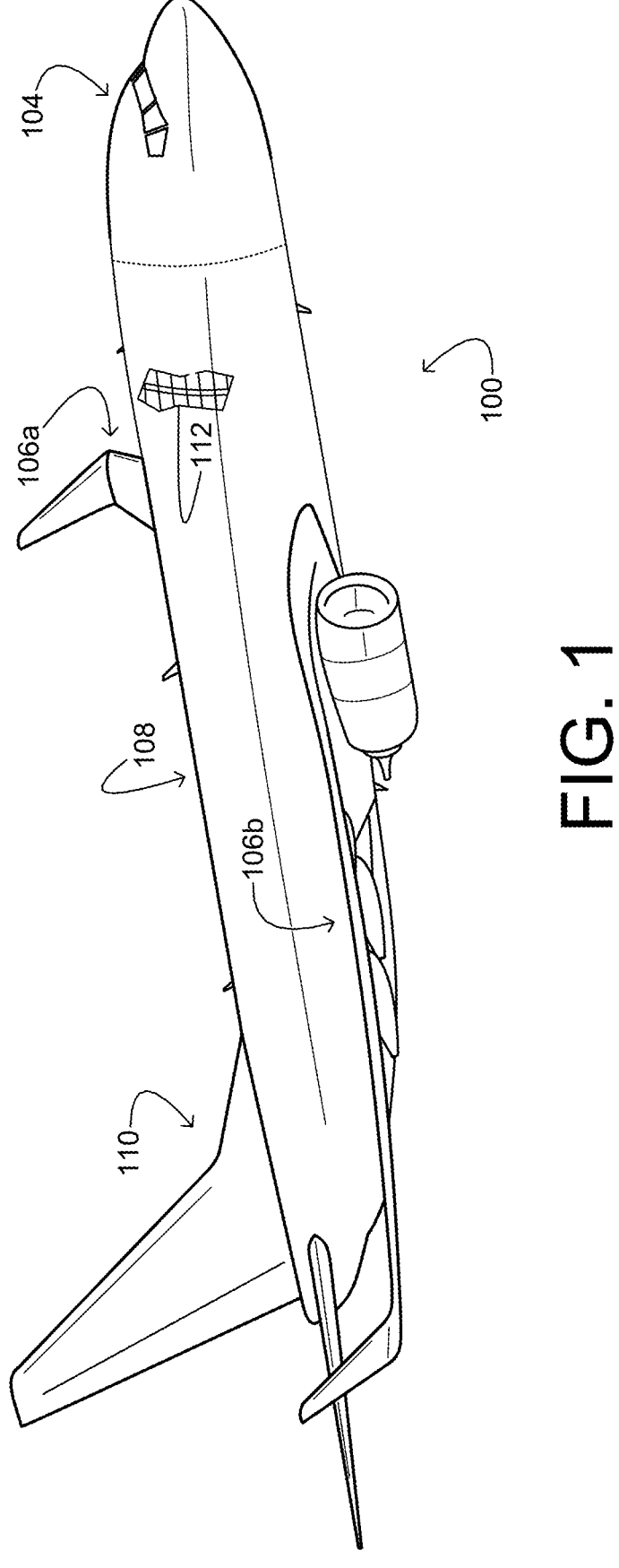
FIG. 1 shows aspects of an example aircraft.

As an example, FIG. 1 shows aspects of an example aircraft 100. The aircraft includes, a nose section 104, wing sections 106A and 106B, a fuselage section 108, and a tail section 110. Any or all of these aircraft sections may include a lightweight skin 112. In some examples, the aircraft skin may comprise fiber-composite material. In some examples, the aircraft skin may comprise a light-weight metal, such as aluminum. The compositions of the fiber-composite materials envisaged herein are generally based on carbon fibers and/or similarly conductive materials. Example fiber-composite materials include carbon fibers immobilized in a polymer or resin. The polymer may be thermosetting in some examples and thermoplastic in other examples. Example thermosetting polymer resins may include one or more of an epoxy-amine resin, a urethane resin, or an acrylamide resin. Such resins may be curable in air. Example thermoplastic polymers include polyetherether ketone (PEEK) and polyetherketoneketone (PEKK), among others.

Figure 2:
FIG. 2 illustrates a wing of an aircraft that comprises a composite structure of multiple panels.

FIG. 2 illustrates an example wing 200 of an aircraft. Wing 200 may be an example of wings 106A and 106B. Wing 200 provides support for jet engine 202. Fuel tank 204 (cutaway) is arranged within wing 200. Wing 200 includes a composite structure 206 of multiple CFRP panels 208a, 208b, 208c, and 208d. In this example, composite structure 206 comprises a portion of an upper wing skin. CFRP panels are connected together with a plurality of conductive fasteners 210. Each fastener may comprise an exposed portion, such as a cap, which is susceptible to conducting high amounts of current, such as from lightning strike 212.

Figure 3:
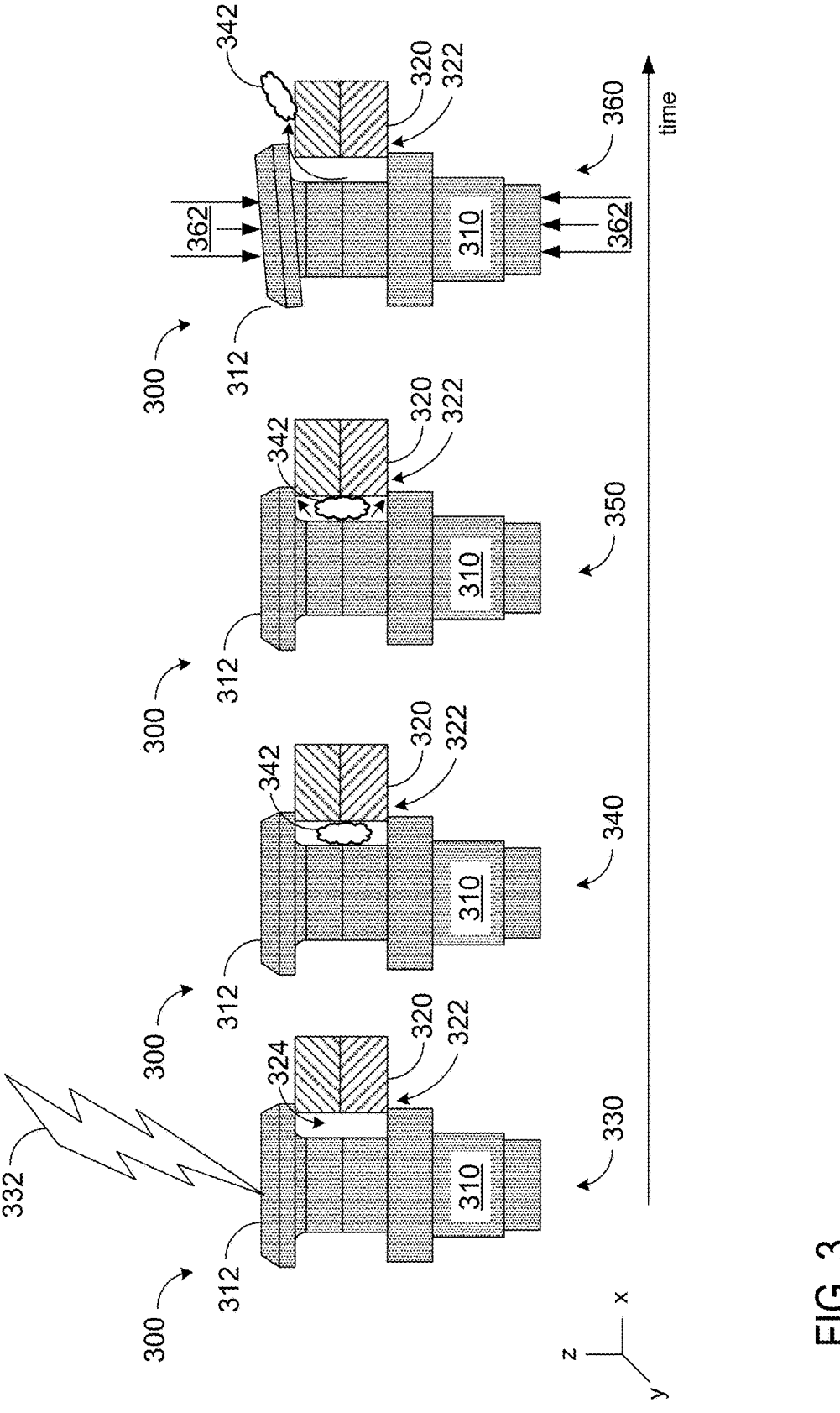
FIG. 3 illustrates a fastened joint in various states following a lightning strike.

FIG. 3 illustrates a fastened joint 300 in various states following a lightning strike. Fastened joint 300 includes a conductive fastener 310 with a conductive cap 312. Fastened joint 300 further comprises one or more CFRP panels 320. In general, conductive fastener 310 includes a conductive metallic material (e.g., aluminum, titanium, stainless steel, etc.) and may include a bolt and a nut, a rivet, a blind fastener, or another fastener device suitable for mechanically joining the CFRP panels 320.

When assembled into fastened joint 300, conductive fastener 310 and CFRP panels 320 form a fastened joint interface 322. A fastener hole 324 is generated between conductive fastener 310 and CFRP panels 320, forming an interface volume.

As such, conductive fastener 310 provides a through-thickness conductivity in the CFRP panels 320 in the z-direction, sometimes referred to herein as a vertical direction. The layers of the CFRP panels 320, by contrast, have anisotropic conductivity in which current is forced in a direction parallel along the layers in the xy-plane. As a result, when lightning strikes fastened joint 300, high levels of current may be undesirably concentrated at conductive fastener 310, potentially degrading the integrity of the fastening connection or causing the fastened joint interface 322 to spark and create an ignition hazard.

As shown at 330, for a fastener lightning strike 332, conductive fastener 310 may be struck directly, or indirectly (e.g., point of strike is nearby and current traffics to the fastener), and may thus experience a high current. The current may then go out of conductive fastener 310 and into composite panels 320. In some examples, the current may go out of composite panels 320 and back into conductive fastener 310. For arrangements such as a lap joint, the current may go back out of conductive fastener 310 and into a second composite layer, then back into conductive fastener 310 and out the end of conductive fastener 310.

As shown at 340, volatized gas 342 is formed during a lightning strike on fastened joint 300 and may create a pressure increase in fastener hole 324. In moving from the fastener into the composite structure, the current passes into the composite structure through the fastened joint interface 322 and/or through plasma channels created between conductive fastener 310 via fastener hole 324. That interface becomes heated, and there is a change of phase of the CFRP material generating some gas which remains in the fastener hole. The combination of heated air and heated gasses may cause the pressure within the interface volume to build up. As shown at 350, the volatized, pressurized gas can deform conductive fastener 310 and penetrate into the fastened joint interface 322.

As shown at 360, if the fluid pressure is sufficient to overcome a fastener preload 362, the excess pressure may cause conductive fastener 310 to breach, opening fastened joint interface 322. This may allow hot gasses to escape in the vicinity of a flammable region, e.g., a fuel tank, causing an ignition hazard.

Herein, systems and methods are presented for modeling the pressure rise due to lightning strikes at the interface between conductive members (e.g., metal fasteners) and decomposable members (e.g., CFRP panels). A model for containment threshold for such interfaces is also presented. The methods herein compare the outputs of the two models to determine the probability of ignition hazard by the strike event at the fastened joint interface. As such, the models are able to predict outgassing events (e.g., the generation of hot gas in the interface, the accompanying pressure increase and the subsequent breach of containment) using multi-physics simulations with test-determined material parameter inputs.

The system and methods herein provide several benefits. For one, they can be used to quickly assess new fastening systems earlier during the design cycle and reduce the use of test matrices to only the configurations deemed most promising. Also, accurate modeling of ignition hazards can reduce the use of testing matrices by assessing and filtering combinations of test variables, test configurations etc. This may reduce the costs and lead times associated with testing for new fastening systems, failure modes, etc. The output of these models may further be used to assess lightning protection features and to provide envelopes based on input parameter uncertainties.

One example provides a physics-based, one-dimensional model (1DIM) that takes inputs of the current waveform, material parameters (e.g., contact resistance), and interface geometry (e.g., available volume) to calculate the pressure generated inside an interface. Related method steps include resolving the heating of the composite, discerning the phase change of the composite and generation of volatiles, and mixing of gaseous products with air in an interface gap (and/or generated gap due to phase change) to determine overall pressure generation. The pressure at the interface can be fed, e.g., via a digital thread, to a 3D structural model that includes a containment threshold, to assess whether the containment will hold or be breached.

These systems and methods can be used to understand how design parameters impact the generation of pressure, temperature, and volatilization at interfaces between conductive members and decomposable members. Further, the systems and methods may be extendable to higher dimensional pressure rise models, allowing for the handling of failure modes and stochastic variables, as well as inclusion models of other failure modes and other sources of ignition hazards beyond the pressure rise.

FIG. 4 shows a flow-diagram for an example method 400 of determining a likelihood of an ignition hazard. Method 400 may be performed by one or more computing devices that include one or more storage subsystems and one or more logic subsystems (e.g., processors). An example computing device is described herein and with regard to FIG. 17.

At 410, method 400 includes receiving a current waveform for a lightning strike event at a conductive member that forms an interface with a decomposable member. The current waveform may comprise data associated with example currents, such as waveforms stored at a storage device. For example, a current waveform may have a peak current amplitude, a decay, and a total integrated energy. The lightning strike event may occur at an exposed cap of the conductive member. In other examples, the lightning strike event may occur elsewhere on the conductive member, or at the decomposable member and migrate to the conductive member.

At 420, method 400 includes receiving material parameter inputs for the conductive member and the decomposable member. The received material properties may include one or more of an interface geometry, an interface volume, material properties of the conductive member, and material properties of the decomposable member. In some examples, the decomposable member comprises carbon-fiber reinforced plastic.

Figure 5:
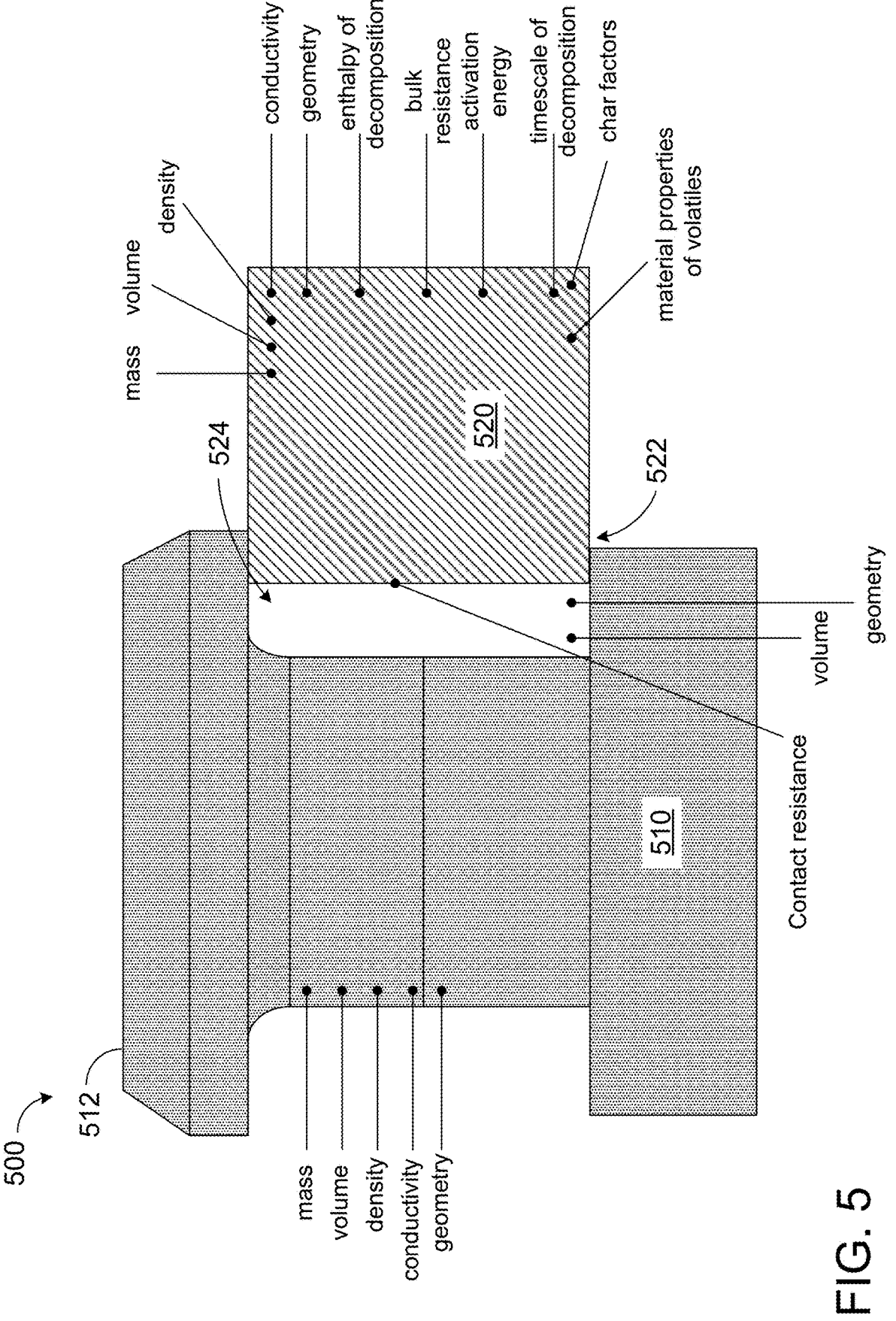
FIG. 5 illustrates material properties of a fastened joint.

FIG. 5 illustrates material properties of a fastened joint 500. Fastened joint 300 may be an example of fastened joint 500. Fastened joint 500 comprises a conductive member 510 with a conductive cap 512. Fastened joint 500 further comprises one or more decomposable members 520. When assembled into fastened joint 500, conductive member 510 and decomposable member(s) 520 form a fastened joint interface 522. A fastener hole is generated between conductive member 510 and decomposable member(s) 520, forming an interface volume 524.

As indicated in FIG. 5, material properties of conductive member 510 include at least mass, volume, density, conductivity, and geometry. Material properties of decomposable member(s) 520 include at least mass, volume, density, conductivity, geometry, enthalpy of decomposition, bulk resistance, activation energy, timescale of decomposition, char factors, material properties of volatiles, and contact resistance of the portion facing the interface volume 524. Material properties of interface volume 524 include at least a geometry and a volume.

The material properties of conductive member 510 and decomposable member(s) 520 may further include fatigue margins, stress margins, power density, damage, other parameters of the conductive member, method of installing the conductive member, and/or other features of the aircraft.

Returning to FIG. 4, at 430, method 400 includes making calculations based at least on the received material parameter inputs and an energy from the current waveform. One or more model types may be applied, such as anisotropic materials models, phase change material models, decomposition models, electrothermal models, and electrochemical models.

At 440, such calculations include resolving a heating of the decomposable member following the lightning strike event. At 450, the calculations include determining a quantity of volatiles generated within the interface volume following the lightning strike event. The quantity of volatiles may be determined based at least on a phase change of the decomposable member. In some examples, method 400 may further comprise receiving one or more of a contact resistance of the interface and a voltage across the interface. One or more of the resolved heating of the decomposable member and the quantity of volatiles generated within the interface volume can be determined based on one or more of the contact resistance of the interface and the voltage across the interface.

For typical lightning strike event time scales, the system is adiabatic (i.e., there is no heat exchange outside the interface volume), there is no work done, and there are no energy losses. The decomposable member has a mass m, a specific heat capacity Cy, and a resistance R. The resistance yields a voltage V when current I is applied via the lightning strike event.

For a simplified system, where the decomposable member comprises a single material, and where decomposition is ignored, the electrical energy of the current may be used for heating only (e.g., Joule heating). The system energy balance may be described by equation (1)

$$\Delta E_{sys} = Q_{in} = Q_{Joule} = Q_{heating} = \int IV dt = \int mc_v dT \qquad \text{(Eq. 1)}$$

Where $\int IV\, dt$ is the electrical energy dissipated and $\int m\, c_v\, dT$ is the heating of the node. The heating of the dominant material is given by equation (2)

$$mc_v(T)\frac{dT}{dt} = IV \qquad \text{(Eq. 2)}$$

As such, based on the input current, and with knowledge of either V or R, the temperature change can be computed by either equation (3) or equation (4).

$$\Delta T = \frac{IV\Delta t}{mcv(T)} \qquad \text{(Eq. 3)}$$

$$\Delta T = \frac{Q_{heating}\Delta t}{mcv(T)} \qquad \text{(Eq. 4)}$$

To expand that to include decomposition, the system energy balance may be described by equation (5).

$$\Delta E_{sys} = Q_{in} = \int IV\, dt = \int m(T)\, c_v(T)\, dT + Q_{decomp} \qquad \text{(Eq. 5)}$$

As such, the electrical energy is used for both heating and decomposition. The decomposition of a material is determined by its enthalpy of decomposition $h_{decomp}$. The enthalpy of decomposition is a material constant. For example, $h_{decomp}$ may represent the amount of energy needed to decompose one gram of the material. The energy spent for decomposition is also determined by the mass available for decomposition. Both the decomposable component and the conductive component may undergo decomposition in response to the increase in current and the corresponding increase in temperature. The conductive component may display pitting, for example. However, the decomposable component generally comprises a lower specific heat than the conductive component. In CFRP materials, the resin in particular is susceptible to decomposition. The long hydrocarbon chains of the resin undergo a phase change or volatilization from a solid state to a gaseous state.

The increase in temperature (e.g., the energy spent on heating) depends on both the mass m and the specific heat $c_v$, as indicated by equation (6).

$$\Delta T = \frac{Q_{heating}\Delta t}{mc_v(T)} \text{ where } Q_{heating} = \int m\, c_v\, dT \qquad \text{(Eq. 6)}$$

The extent of decomposition may be represented by a, such that when $\alpha=0$, no decomposition has occurred, and when $\alpha=1$, all available mass has been decomposed. Energy spent for decomposition may be represented by equation (7).

$$Q_{decomp} = \int m_0 h_{decomp} d\alpha \qquad \text{(Eq. 7)}$$

In this relationship, when $\alpha=0$, $Q_{decomp}=0$, and when $\alpha=1$, $Q_{decomp}=m_0\, h_{decomp}$. As such, $$\alpha = \frac{\frac{m}{m_0} - 1}{\mu - 1},$$

where $m_0$ is the total mass available for decomposition m is the residual amount of mass and $\mu$ is the char fraction of the material. Accordingly, the increase of a depends on the mass m and the enthalpy of decomposition $h_{decomp}$. This relationship may be represented by equation (8).

$$\Delta\alpha = \frac{Q_{decomp}\Delta t}{m_0 h_{decomp}} \qquad \text{(Eq. 8)}$$

Thus, the electrical energy dissipated (IV) is equal to the sum of the energy spent heating the interface volume and the energy spent in decomposition, as shown by equation (9).

$$IV = m(T)c_v(T)\frac{dT}{dt} + m_0 h_{decomp}\frac{d\alpha}{dt} \qquad \text{(Eq. 9)}$$

As the mass is decomposed, there is less solid mass to heat, though there is evolved gas to heat. As such, solid mass m is temperature-dependent. To determine the energy needed for decomposition, the definition of $h_{decomp}$ can be applied, yielding equation (10).

$$\frac{d\alpha}{dt} = \frac{Q_{decomp}}{m_0 h_{decomp}\Delta t} \qquad \text{(Eq. 10)}$$

However, where there is both heating and decomposition, it is not knowable a priori how much energy is directed towards each. The decomposition, like other phase change processes, should depend on the temperature of the material. Decomposition can be represented by an Arrhenius rate law (equation (11)), that correlates temperature to the rate of decomposition.

$$\frac{d\alpha}{dt} = f(\alpha)a_p\exp\left(-\frac{EA}{RT}\right) \qquad \text{(Eq. 11)}$$

Figure 6:
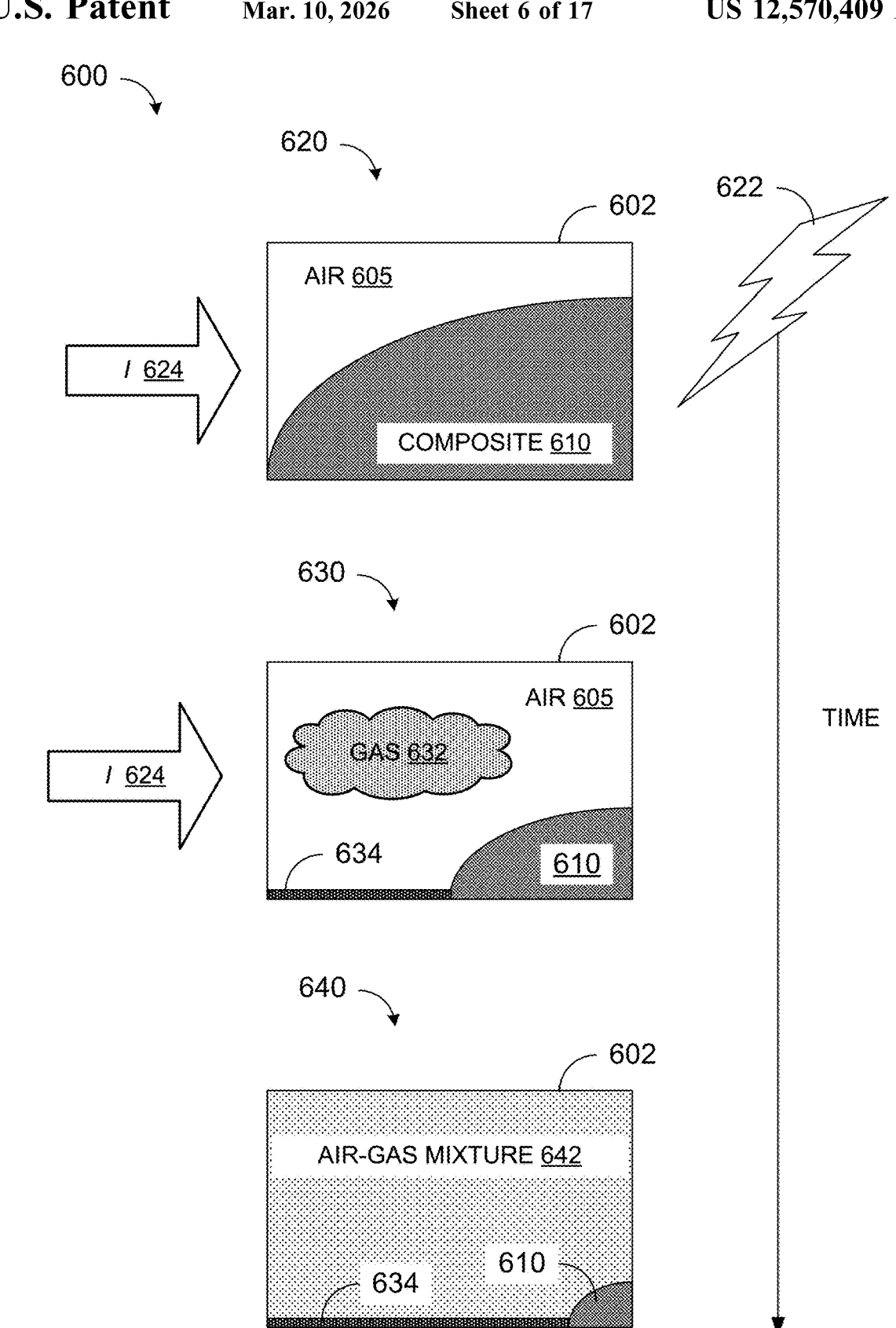
FIG. 6 illustrates decomposition of the decomposable member over time following a lightning strike event.

FIG. 6 shows an example progression 600 for the heating and decomposition of a decomposable member over time following a lightning strike event. An example interface volume 602 comprises air 605 and composite material 610. At 620, a lightning strike event (622) occurs, sending current 624 into interface volume 602. At 630, current 624 is still directed to interface volume 602. Composite material 610 has decomposed into volatile gasses 632 and char 634. Air inside the interface volume heats up, increasing the partial pressure of air inside the volume, per the ideal gas law. The fraction of products of decomposition that is char is accounted for by the rate law of equation (11). At 640, current through interface volume 602 has ceased. Composite material 610 has further decomposed into volatile gasses 632 and char 634. Volatile gasses 632 and air 605 have comingled to generate an air-gas mixture 642.

The composite material simultaneously heats and decomposes. To determine the relative distribution of energy, equations (9) and (11) may be solved simultaneously. By doing so, it becomes apparent that when the temperature is relatively low, the heating of the node dominates, and the rate of decomposition is relatively slow. Heating increases until a temperature is reached that is high enough to activate the rate law, at which point decomposition dominates. The temperature rise takes the composite material from a state where it's merely being heated to a state where it is decomposing. So the material decomposition is also a temperature dependent process. This relationship assumes that contact resistance provides Joule heating, and that the node has constant volume. If the mass available for decomposition is fully depleted, either there is no further heating, as there is no current path, or the char and gasses in thermal equilibrium are heated. It is further assumed that the input electrical energy goes directly through the contact resistance to the solid composite material.

As shown at 640 of FIG. 6, the decomposed gasses and air within the node mix, generating a common pressure within the node. The temperature of the mixture is given by equations (12) (e.g., from energy conservation) and (13).

$$T_{mix} = \frac{\sum_i m_i c_{v_i} T_i}{\sum_i m_i c_{v_i}} \qquad \text{(Eq. 12)}$$

$$T_{mix} = \frac{\Delta m_{gas} c_{v_{gas}}(T_{solid})T_{solid} + \left[m_{gas}^{exisiting} c_{v_{gas}}\left(T_{mix}^{existing}\right) + m_{airint}c_{v_{air}}\left(T_{mix}^{existing}\right)\right]T_{mix}^{existing}}{m_{gas}c_{v_{gas}}\left(T_{mix}^{existing}\right) + m_{airint}c_{v_{air}}\left(T_{mix}^{existing}\right)} \qquad \text{(Eq. 13)}$$

Where $\Delta m_{gas}$ $c_{v_{gas}}$ $(T_{solid})$ $T_{solid}$ represents newly formed gas at any given time point and $[m_{gas}^{exisiting}$ $c_{v_{gas}}$ $(T_{mix}^{existing})$+$m_{airint}$ $c_{v_{air}}$ $(T_{mix}^{existing})]T_{mix}^{existing}$ represents the existing air-gas mixture at the previous time point.

Returning to FIG. 4, at 460, method 400 includes determining a total pressure generation within the interface volume based on the resolved heating and the determined quantity of volatiles. The total pressure generation within the interface volume may be further based on a mixing of gaseous products with air within the interface volume.

The ideal gas law may then be employed to derive the pressure at the interface volume, as shown in equation (14).

$$p_{interface} = \left(\frac{m_{airint}}{M_{air}} + \frac{m_{gas}}{M_{gas}}\right)\frac{RT_{mix}}{V_{interface}} \qquad \text{(Eq. 14)}$$

Although equations 9-14 are implemented as mass formulation, equivalent assessments or frameworks could be used with respect to density.

Returning to FIG. 4, at 470, method 400 includes outputting a probability of ignition hazard by the lightning strike event based on a comparison of the total pressure generation and a containment pressure threshold for the interface volume. In examples where the conductive member is a fastener, the containment pressure threshold may be based on at least a fastener preload.

The containment model may be run to generate a threshold for ignition hazard. The containment model assumes a structure that is clamped up with a finite force. Lightning strike creates a pressurized vessel that will have a compliance to the forces resulting from that pressure. The structure is capable of deforming to the point where the clamping is breached, leading to outgassing.

The output pressure of method 400 may then be compared to the containment threshold. In other examples, the output pressure of method 400 may be fed as an input to the containment model to determine whether there will be an interface breach under the operating pressures. As such, the model can be used to determine the containment threshold, and also to determine a probability of containment escape.

The deformation state of the conductive member and decomposable member may be determined using solid mechanics equations that solve for displacement of the materials in the system. A mechanical equilibrium may be defined by Equation (15), where t is a surface traction on the faces of the conductive member and decomposable member, and f are the body forces.

$$\int_S t\,dS + \int_V f\,dV = 0 \qquad \text{(Eq. 15)}$$

Such an equilibrium may also take into account stress tensors and the symmetry thereof, strain tensors, deformation gradients, material constitutive tensors, and configurations for both the reference configurations and deformed configuration of the system. Surface tractions may include externally applied forces, such as pre-load and pressure, for each element of the system. The total surface traction may be used to solve for the internal stress state, which in turn may be used to solve for the strain state. The strain state informs the deformation, which may be used to solve for movement within the model.

The containment model may be an implicit model where the maximum boundary conditions are applied, and the final deformed state is solved for. For example, the stress tensor includes the internal pressure. Equation (15) may be considered a conservation of energy of the solid materials of the system. The current state may be computed including the current configuration of the reference and the material. Then, the applied stress tensor is applied to the current state to generate the deformed state, demonstrating how the material changes because of the stress and strain tensors.

Figures 7A, 7B:
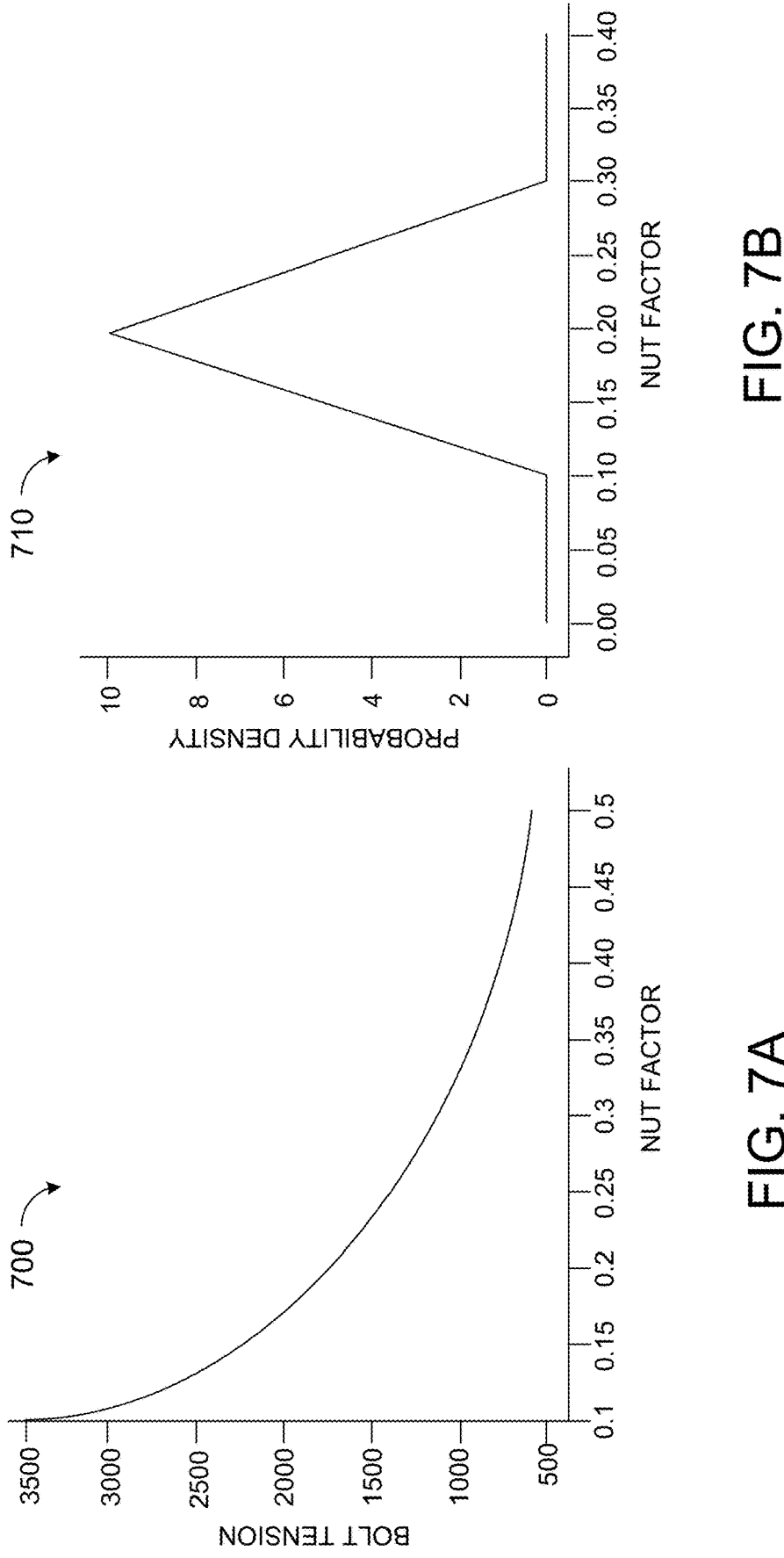
FIG. 7A is an exemplary plot showing bolt tensions of a fastener across a range of nut factors.
FIG. 7B is an exemplary plot showing probability density over a range of nut factors.

The containment model may take into account a range of possibilities for the current state. For example, the probability of ignition hazard by the lightning strike event may be further based on an uncertainty in the values of input parameters, such as a nut factor of the fastener. The in-service nut factor for each fastener can vary across a wide range, based on differences in lubrication, wear and corrosion. FIG. 7A shows an example plot 700 indicating bolt tension across a range of nut factors from 0.1 (over-lubricated) to 0.5 (excessive friction). Over this range, the bolt tension (for a given torque of 87 in-lb and a given diameter of 0.25 in) varies from 3500 lbs to 700 lbs. FIG. 7B shows an example plot 710 for an example nut factor input to the containment model. Plot 710 varies the nut factor between 0.1 and 0.3 with a triangular distribution (assuming a mode at 0.2). Over a plurality of model executions, a range of in-service containment performances can be derived.

Boundary conditions for the containment model also vary based on the real-world features of the fastener and the decomposable member. Such conditions can be varied in the containment model to generate a range of potential outcomes. In other words, across a particular boundary condition, the pressure at which the system is breached may vary.

Figure 8C:
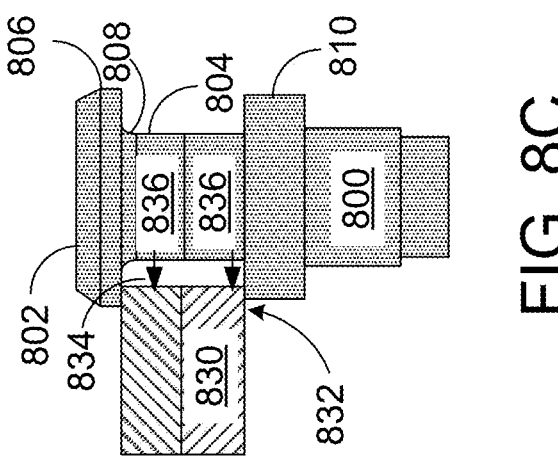
FIG. 8C illustrates fluid penetration pressure applied to the example fastener.
Figure 8B:
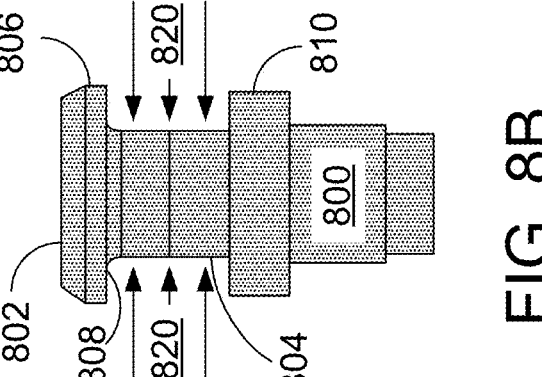
FIG. 8B illustrates lateral pressure applied to the example fastener.
Figure 8A:
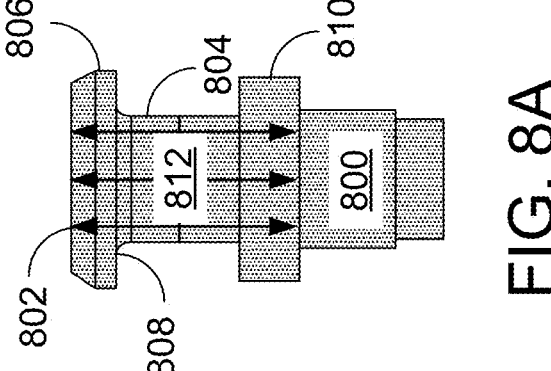
FIG. 8A illustrates a bolt preload of an example fastener.

FIGS. 8A-8C depict a fastener 800 experiencing various boundary conditions. Fastener 800 includes at least a fastener cap 802, a fastener shank 804, a laminate edge 806, a fastener joint 808, and a shank midsurface 810.

FIG. 8A shows a fastener preload 812 applied to midsurface 810 of fastener shank 804. The fastener preload 812 may be determined based on at least a configuration of fastener joint 808. The fastener preload 812 may be further based on fluid pressure penetration into fastener joint 808. Fastener preload 812 may represent an amount of tension put in the fastener, e.g., may be based on the nut factor. The fastener preload 812 may randomly vary in-service. As such, fastener preload 812 may be randomly varied across a range of values in the containment model.

Similarly, FIG. 8B shows lateral pressure 820 applied to the fastener shank 804 and laminated edge 806 within a fastener hole. The preload and other configurations of fastener 800 may determine a response curve in response to increasing lateral pressures.

FIG. 8C shows fastener 800 in a system with a CFRP substrate 830, generating an interface 832 and an interface volume 834. Fluid penetration pressure 836 is applied from interface volume 834 to interface 832. Both the material properties of fastener 800 and CFRP substrate 830, along with their joined configuration, may influence how fluid penetration pressure 836 impacts the integrity of interface 832 and fastener joint 808.

Figure 9:
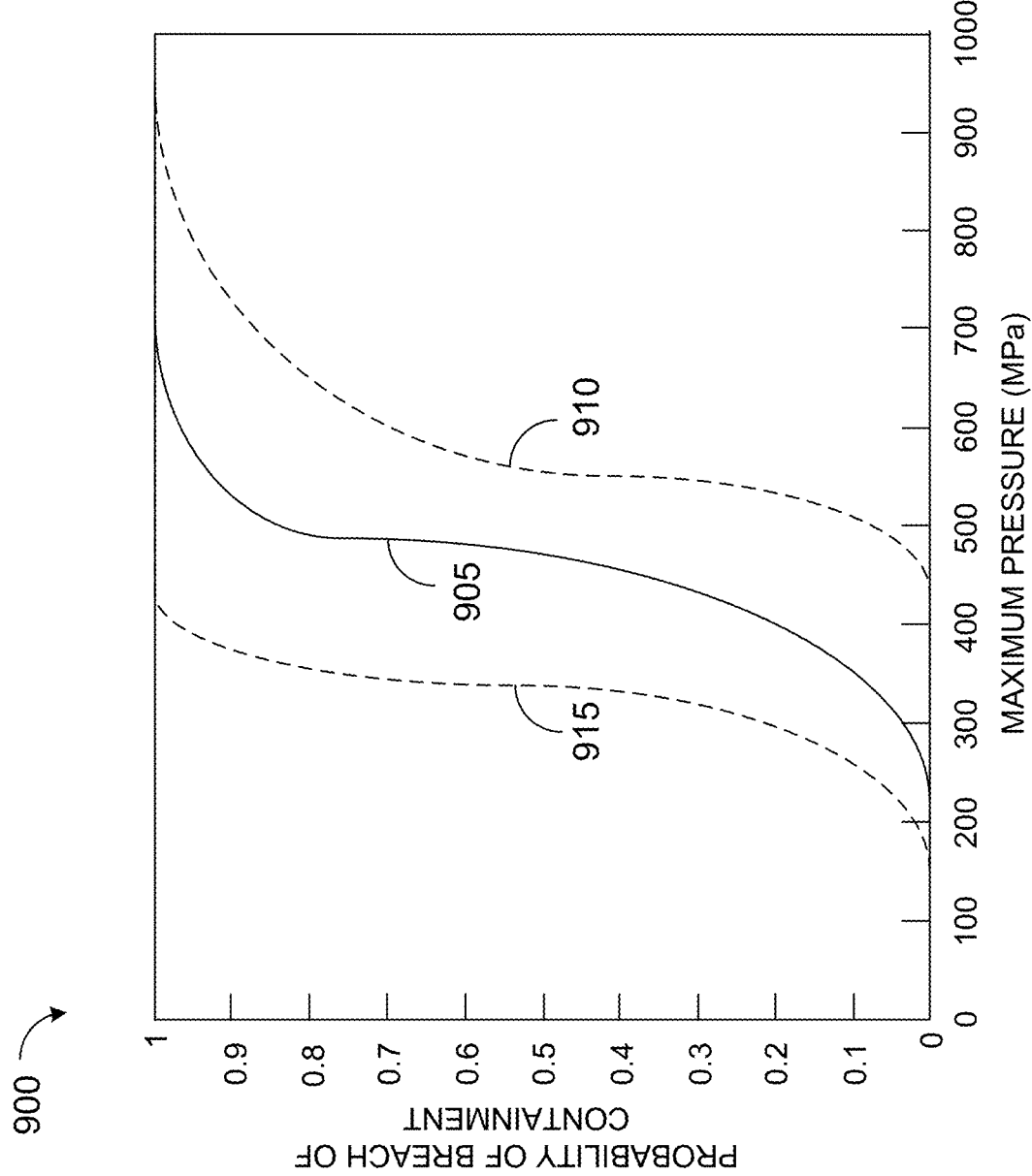
FIG. 9 shows an example S-curve illustrating probability of breach versus maximum pressure.

The output probability may be an S-curve indicating a probability of ignition hazard against current, where the probability of ignition hazard is based at least on the uncertainty of the nut factor. FIG. 9 shows a plot 900 indicating an example S-curve illustrating a probability of breach versus maximum pressure. Plot 900 includes a median curve 905, an upper bound 910, and a lower bound 915. Each of median curve 905, upper bound 910, and lower bound 915 is shaped as an S-curve such that lower values for maximum pressure present little or no probability of a breach of containment for each curve, while higher values for maximum pressure present high or definite probability of a breach of containment for each curve. As an example, a pressure of 325 megapascals (MPa) yields a 50% probability of a breach of containment for lower bound 915, while 450 MPa yields a 50% probability of a breach of containment for median curve 905, and 550 MPa yields a 50% probability of a breach of containment for upper bound 910. Thus, for each maximum pressure, a range of probabilities may be outputted.

Figures 10A, 10B, 10C:
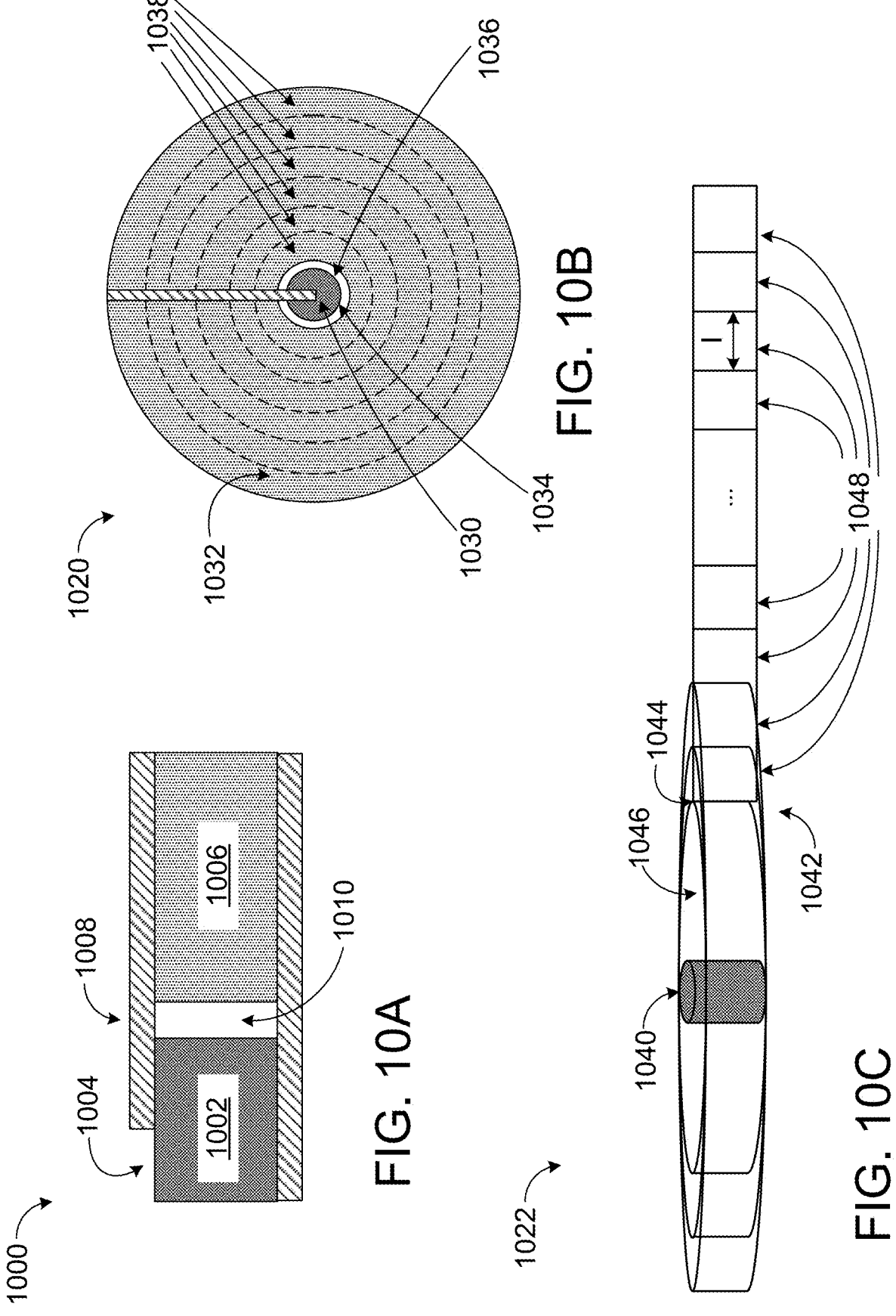
FIG. 10A shows a cross section of a 0-dimensional model.
FIG. 10B shows a top-down view of a 1-dimensional model.
FIG. 10C shows an extended axial cross-section of a 1-dimensional model.

In general, FIGS. 4-9 deal with the heating and decomposition of the decomposable member in a 0-Dimensional (0DIM) fashion. FIG. 10A shows a cross section of a 0DIM model with a conductive member 1000 having a conductive current input 1002. Decomposable member 1004 forms an interface 1006 with conductive member 1000, with an interface volume 1008 therebetween. In this configuration, the interface volume is lumped into a single cell or 0DIM volume. This type of model may yield time dependency as relates to pressure and temperature but does not provide spatial dependency.

Adding additional dimensions to the model allows for determining how far into the decomposable member the interface has decomposed. FIGS. 10B and 10C show example 1-Dimensional (1DIM) models 1020 and 1022, respectively. FIG. 10B shows a top-down view of 1-dimensional model 1020 having a conductive member 1030, a decomposable member 1032, an interface 1034 between the two members, and an interface volume 1036. Decomposable member 1032 is divided into a plurality of nodes 1038. In this example, the dimension is axisymmetric. Each node has a radial length r and the volume of a torus.

FIG. 10C shows an extended axial cross-section of 1-dimensional model 1022 having a conductive member 1040, a decomposable member 1042, an interface 1044 between the two members, and an interface volume 1046. Decomposable member 1042 is divided into a plurality of nodes 1048. In this example, each node has a length l and the volume of a regular parallelepiped.

For either 1DIM model, node thickness may be set to an appropriate value based on the material of the current input; as a non-limiting example, the node thickness may be set to be on the order of a few microns. For the first node, at the interface volume opposite the conductive member, there are high conductive current conditions where there is enough heating to significantly trip the rate law and have decomposition dominate. Decomposing nodes leads to a larger interface volume and larger amounts of generated gasses. The additional gasses yield a larger pressure within the interface volume. However, for low conductive current cases, there may not be any decomposition at all.

In further examples, the model can be translated into two or three dimensions, allowing for the consideration of additional geometrical considerations. For example, if the fastener is misaligned with the surrounding panels, the effects of lightning striking such a fastener can only be described in a two- or three-dimensional manner, based on which axis the fastener is offset. The added dimension(s) allow for a more sophisticated understanding of temperature-induced decomposition and the subsequent pressure rise.

Figure 11:
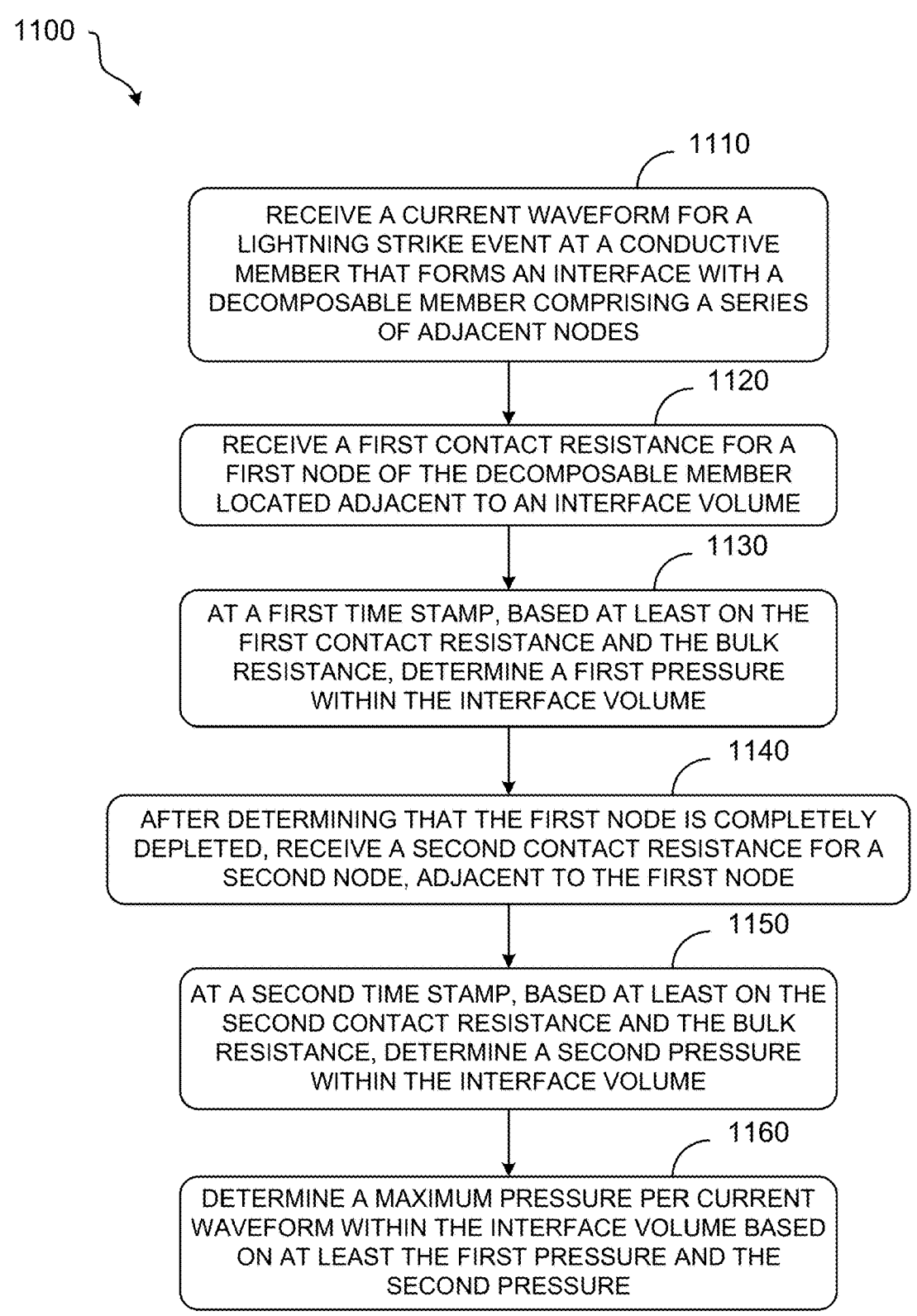
FIG. 11 shows a flow diagram for an additional example method for determining a likelihood of an ignition hazard.

FIG. 11 shows a flow-diagram for an example method 1100 of determining a likelihood of an ignition hazard. Method 1100 may be performed by one or more computing devices that include one or more storage subsystems and one or more logic subsystems (e.g., processors). An example computing device is described herein and with regard to FIG. 17.

At 1110, method 1100 comprises receiving a current waveform for a lightning strike event at a conductive member that forms an interface with a decomposable member comprising a series of adjacent nodes. For example, a current waveform may have a peak amplitude, a decay, and a total energy. The lightning strike event may occur at an exposed cap of the conductive member. In other examples, the lightning strike event may occur elsewhere on the conductive member, or at the decomposable member and migrate to the conductive member. In some examples, the decomposable member comprises carbon-fiber reinforced plastic (CFRP).

The decomposable member may comprise a series of nodes extending outward from the interface. Examples of such a representation are shown in FIGS. 10B and 10C. Node thicknesses may be set so that all nodes have equivalent lengths (or radial distances), equivalent mass, equivalent volume, etc. In other examples, nodes may be determined in a non-linear fashion, such non-linear configurations may require different resistance models to perform the calculations herein.

At 1120, method 1100 comprises receiving a first contact resistance for a first node of the decomposable member located adjacent to an interface volume. In some examples, method 1100 further comprises receiving a bulk resistance for the decomposable member. Contact resistance may be determined at a wall of the interface volume, while bulk resistance may be determined for the entirety of the decomposable member. The bulk resistance is based on the resistance of the decomposable material(s). The contact resistance is generally higher than the bulk resistance, accounting for the effects at the interface wall.

Figure 12:
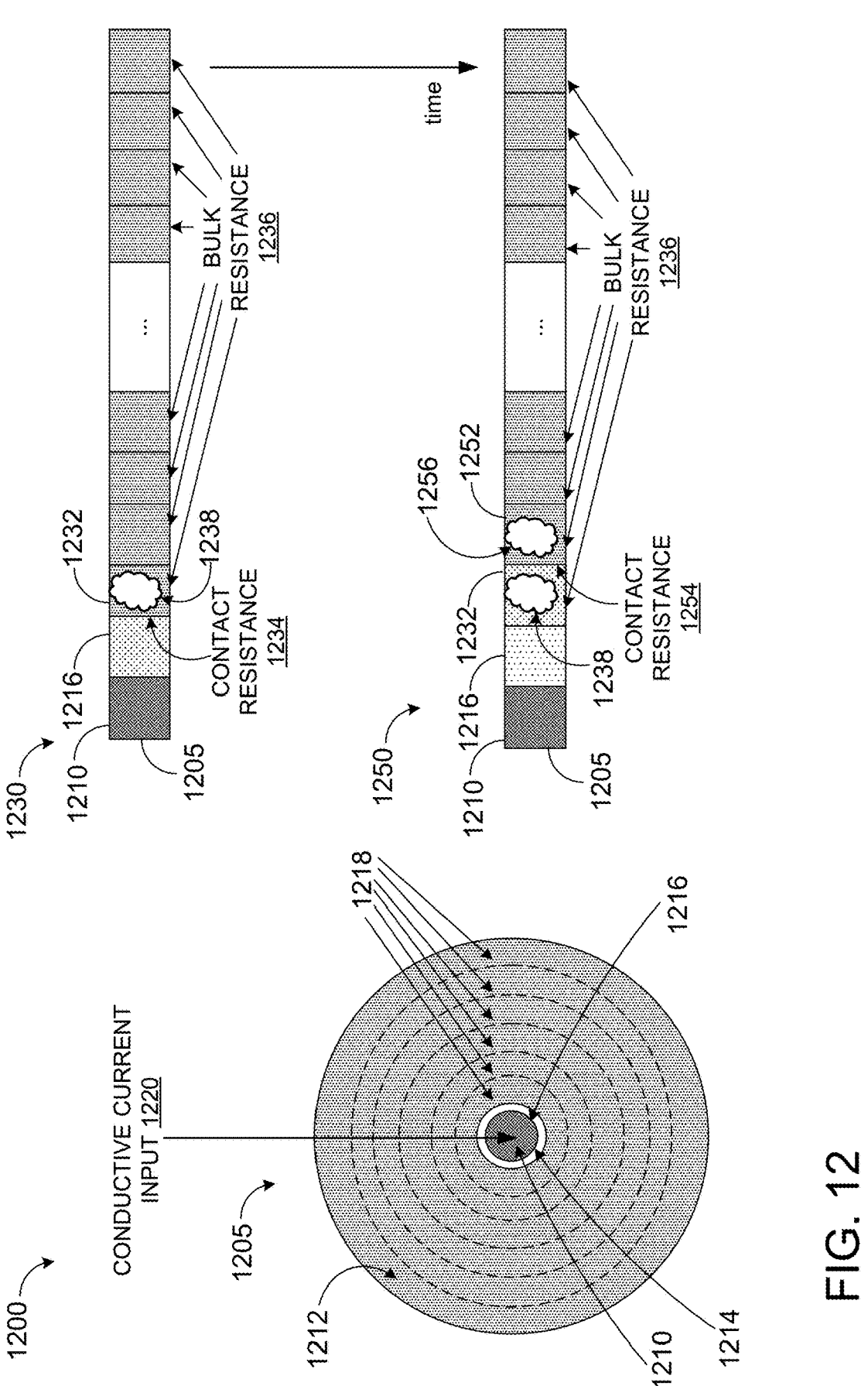
FIG. 12 shows a moving propagation front for a decomposable member.

Turning to FIG. 12, at 1200 FIG. 12 shows a top-down view of 1-dimensional (1DIM) model 1205 having a conductive member 1210, a decomposable member 1212, an interface 1214 between the two members, and an interface volume 1216. In some examples, the decomposable member 1212 comprises carbon-fiber reinforced plastic (CFRP). Interface volume 1216 may be considered a closed, constant volume in some models. Decomposable member 1212 is divided into a plurality of concentric nodes 1218 that extend outward from conductive member 1210. A conductive current input 1220 is shown being applied to conductive member 1210.

At 1230, FIG. 12 shows a linearized version of 1-dimensional model 1205 at a first time stamp. Interface volume 1216 is adjacent to first node 1232. First node 1232 is characterized by a contact resistance 1234, while the remainder of nodes are characterized by bulk resistance 1236. Bulk resistance 1236 may be based on the material properties of decomposable member 1212 as well as the radial distance for each node. First node 1232 is undergoing decomposition to yield gasses 1238.

When determining the bulk resistance of the decomposable member, in some examples, the material comprising the decomposable member has anisotropic conductivity. For such a material, the resistance needs to be represented in a one-dimensional (1DIM) framework in order to simplify the calculations to an isotropic representation that will correspond to the 1DIM methodology in an axisymmetric domain.

Figure 13B:
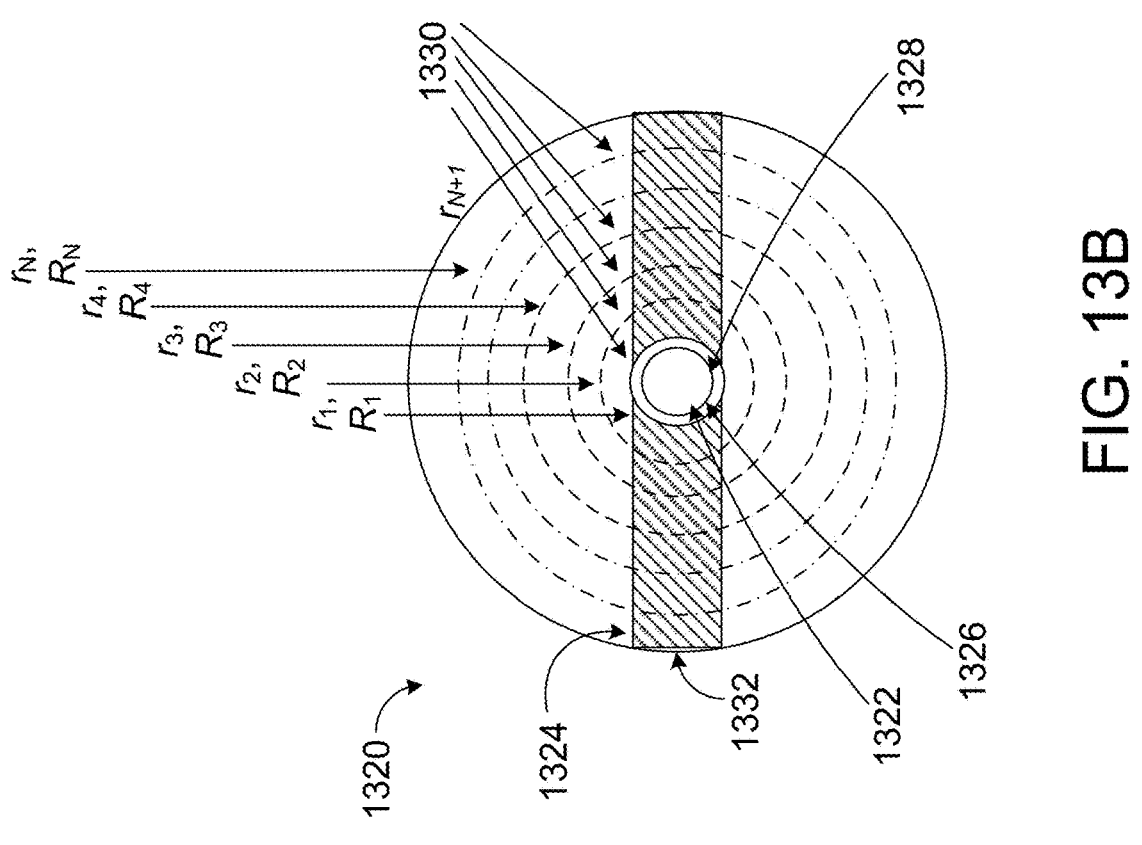
FIGS. 13A and 13B show approaches for determining bulk resistance for a decomposable member having an anisotropic conductivity.
Figure 13A:
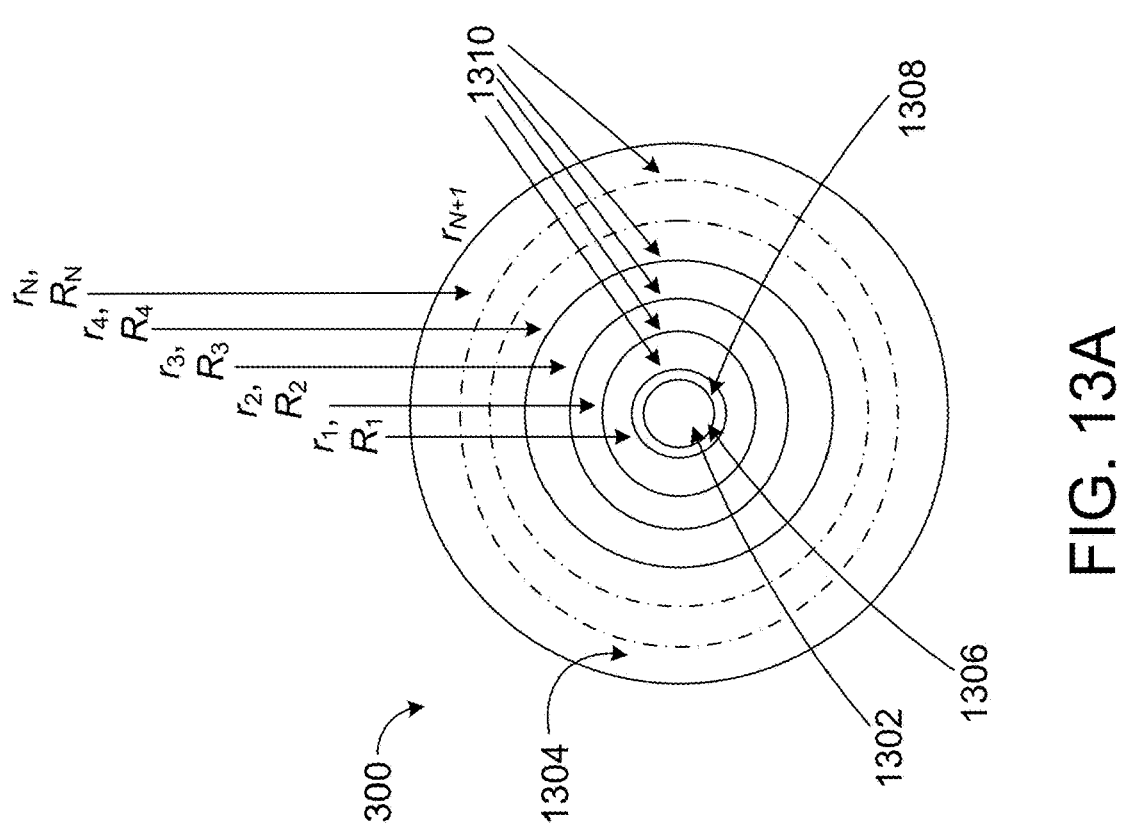

In a first example, FIG. 13A shows a top-down view of 1-dimensional (1DIM) model 1300 having a conductive member 1302, a decomposable member 1304, an interface 1306 between the two members, and an interface volume 1308. Decomposable member 1304 is divided into a plurality of concentric nodes 1310. In this example, the dimension is axisymmetric. One approach is to simply assume that the material of the decomposable member has isotropic conductivity. This may be represented by equation (16).

$$R_n = \frac{1}{\pi t(\sigma_p + \sigma_t)}\ln\left(\frac{r_{n+1}}{r_n}\right) \qquad \text{(Eq. 16)}$$

In a second example, FIG. 13B shows a top-down view of 1-dimensional model 1320 having a conductive member 1322, a decomposable member 1324, an interface 1326 between the two members, and an interface volume 1328. Decomposable member 1324 is divided into a plurality of concentric nodes 1330. In this example, the dimension is axisymmetric. In this approach, the anisotropic conductivity is included in the resistance estimation. This may be represented by equation (17).

$$R_{bulk} = \frac{1}{8r_f^2 t\sigma_p}$$
$$\left[r_f\sqrt{r_{n+1}^2 - r_f^2} - r_f\sqrt{r_n^2 - r_f^2} + r_{n+1}^2\,\text{asin}\left(\frac{r_f}{r_{n+1}}\right) - r_n^2\,\text{asin}\left(\frac{r_f}{r_n}\right)\right] \qquad \text{(Eq. 17)}$$

In this example, the calculations effectively take a shadow of the conductive member. For tape-style materials like CFRP, there is a preference for conducting along those tapes (e.g., carbon fibers), as the conductivity along the coil of the tape is higher than in the transverse direction. This allows for scaling of the 3D effect down into the 1DIM model. Both shadowing and scaling approaches are effectively approximations of bulk resistance but are valid for different materials and different anisotropy.

Returning to FIG. 11, at 1130, method 1100 comprises, at a first time stamp, based at least on the first contact resistance, determining a first pressure within the interface volume. In some examples, the first pressure may be further based on the bulk resistance. For example, pressure may be determined as described with regard to FIG. 4, based on heating and decomposition. The determined pressure is further based on at least material parameter inputs comprising at least an interface geometry, an interface volume, material properties of the conductive member, and material properties of the decomposable member.

The material properties of the decomposable member comprise at least a mass of each node and a specific heat capacity of each node. Determining the first pressure comprises at least resolving a heating of the decomposable member following the lightning strike event and determining a quantity of volatiles generated within the interface volume following the lightning strike event.

Figure 14A:
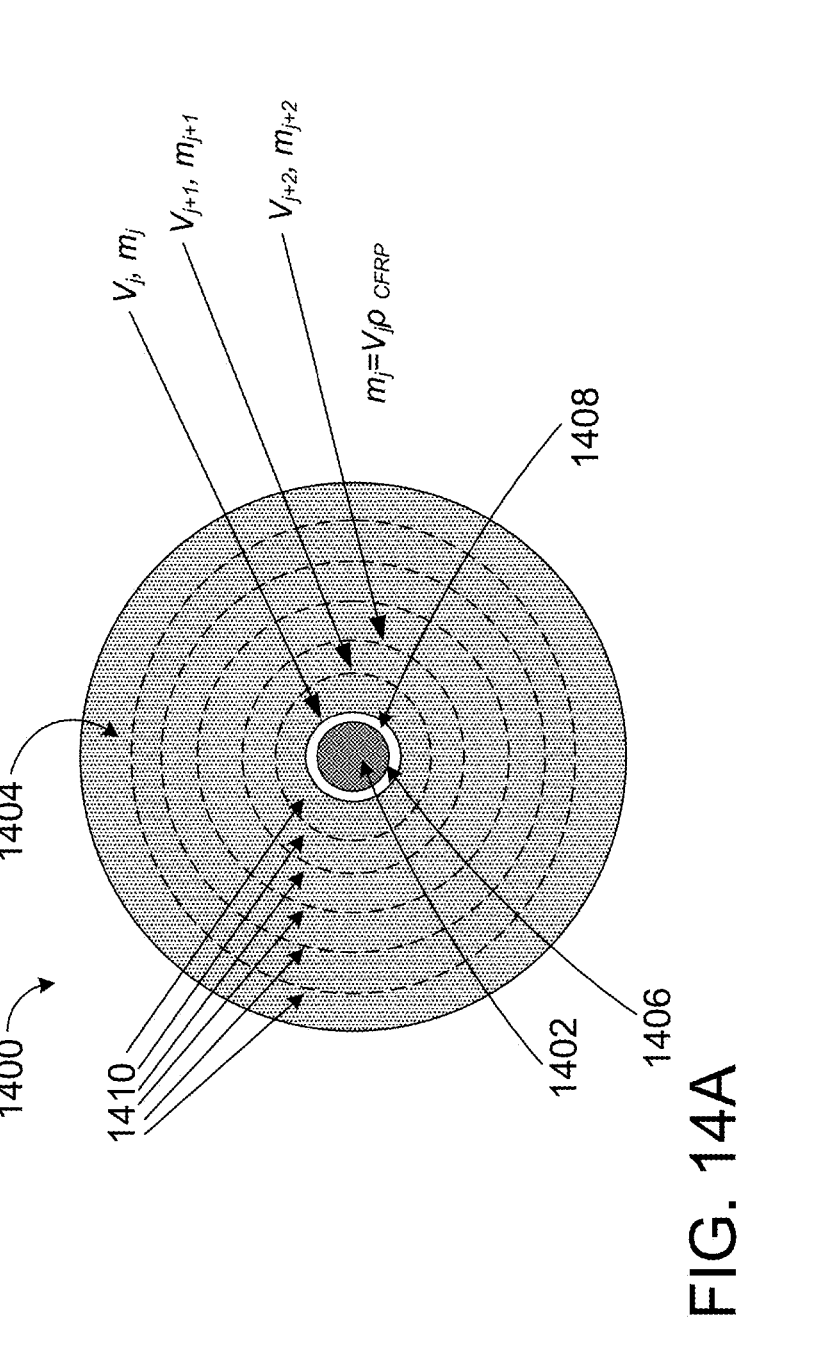
FIG. 14A schematically shows mass and volume of nodes of a decomposable member.

In a first example, FIG. 14A shows a top-down view of 1-dimensional model 1400 having a conductive member 1402, a decomposable member 1404, an interface 1406 between the two members, and an interface volume 1408. Decomposable member 1404 is manufactured out of CFRP and divided into a plurality of concentric nodes 1410. Each of concentric nodes 1410 may be described in terms of a volume V and a mass m, where $m_j = V_{j\rho\ CFRP}$. For this axisymmetric model 1400, the mass available in each node is different as the volume is different e.g., the mass increases as nodes move radially outwards from conductive member 1402.

Figure 14B:
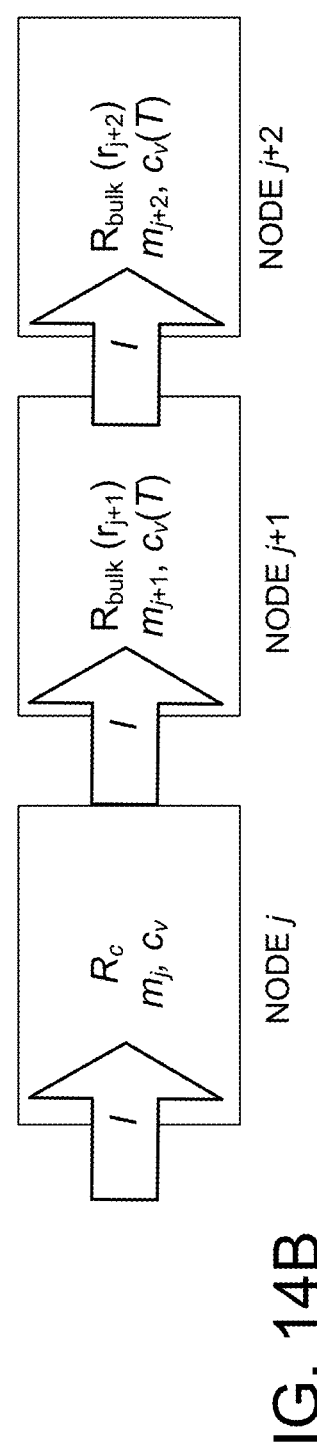
FIG. 14B shows propagation of current through nodes of a decomposable member.

FIG. 14B describes how the electrical energy from a lightning strike event is dissipated by each node. At 1420, node j has a contact resistance $R_j$, a mass $m_j$, and a specific heat capacity $c_v$. At 1430, node j+1 has a bulk resistance $R_{bulk}$ that is dependent on the node radius $(r_{j+1})$ a mass $m_{j+1}$, and a specific heat capacity $c_v$ that is dependent on the node temperature (T). Similarly, at 1440, node j+2 has a bulk resistance $R_{bulk}$, a mass $m_{j+2}$, and a specific heat capacity $c_v$ that is dependent on the node temperature (T).

For each node, energy based on current I is taken as input. If the temperature of the node is below a threshold temperature necessary to activate the rate law based on the node material composition, heating is dominant, and decomposition progresses slowly. Heating occurs until the threshold temperature, upon which decomposition dominates. Electrical energy dissipated (IV) is thus equal to the sum of the energy spent heating the interface volume and the energy spent in decomposition, as shown by equation (18).

$$I(t)^2 R(I, r) = m(T, r)cv(T)\frac{dT(r, t)}{dt} + m_0(r)h_{decomp}\frac{d\alpha(r, t)}{dt} \quad (Eq. 18)$$

The rate of decomposition may be described by equation (19).

$$\frac{d\alpha(r, t)}{dt} = f(\alpha)A\exp\left(-\frac{E_A}{RT(r, t)}\right) \quad (Eq. 19)$$

The electrical energy dissipated by each node may be described similarly to equation 9, except for a radial coordinate (r) that updates as the propagation front moves outward from the conductive member. This node-by-node modeling provides spatial information about where decomposition is occurring within decomposable member 1404. Such modeling also has the additional benefit of reducing some of the assumptions, such as the decomposed level of mass a priori assumption. In implementing node-by-node modeling, some assumptions include that the current flows through all nodes equally, that the contact resistance is applied at the first node (e.g., at the decomposition front)

only, and that the remainder of the decomposable nodes have a bulk resistance based on their distance from the conductive member. The mass for each node is defined by the cell volume, and all of the mass is available for decomposition. The interface volume has a constant volume. Further, once a node has been depleted, it is excluded from the remaining iterations of the process.

Returning to FIG. 11, at 1140, method 1100 comprises, after determining that the first node is completely depleted, receiving a second contact resistance for a second node, adjacent to the first node. Returning to FIG. 12, at 1250, FIG. 12 shows the linearized version of 1-dimensional model 1205 at a second time stamp. At this second time stamp, first node 1232 is fully depleted. As first node 1232 is decomposed, the decomposition front moves to an adjacent, second node 1252 and the contact resistance 1254 changes accordingly. The decomposition front may be identified according to a node wherein $0 < \alpha < 1$. When adjacent, second node 1252 is fully depleted, contact resistance moves to the next most adjacent node. Bulk resistance 1236 remains constant for the remaining nodes. The decomposition front propagation stops when the input energy drops below a predetermined threshold due to energy depletion or the current pulse finishing.

Regardless, the decomposition front propagation and associated contact resistance are calculated for each time stamp, irrespective as to whether the cell at the propagation front has been depleted or not. When the material behind the propagation front has been depleted, the calculations move to the next cell. Current dominates the contact resistance, particularly at time points immediately following the lightning strike event. Contact resistance may change from node to node as the propagation front moves outward and the current dwindles.

Nodes further away from the decomposition front may decompose if current and bulk resistance generate sufficient heating to initiate decomposition. However, this gas will not enter the interface volume until and unless the nodes are connected to the interface volume by the propagation of the decomposition front. This decomposition does deplete the energy available from the conductive current input.

At 1150, method 1100 comprises at a second time stamp, based at least on the second contact resistance, determining a second pressure within the interface volume. In some examples, the second pressure may be further based on the bulk resistance. The second pressure may be further based on at least material parameter inputs comprising at least an interface geometry, an interface volume, material properties of the conductive member, and material properties of the decomposable member.

At 1160, method 1100 comprises determining a maximum pressure per current waveform within the interface volume based on at least the first pressure and the second pressure. In some examples, determining a maximum pressure per current waveform within the interface volume comprises determining a stopping point of a decomposition front responsive to depletion of energy of the current waveform.

Method 1100 may further comprise receiving additional contact resistances at a plurality of additional time stamps. Pressure may be modeled at each time stamp. A certain time stamp will thus have a maximum pressure for the lightning strike event. The maximum pressure in the interface volume may be used to determine the extent that the head of the fastener is moving and how much the composite is moving relative to the fastener at the interface of the two members. This can inform the probability of a breach, as determined by a containment model over ranges of material uncertainty.

For a given fastener system, when a certain maximum pressure is achieved at the interface, a percentage chance or confidence intervals of failure can be output.

Method 1100 may thus further comprise outputting a probability of ignition hazard by the lightning strike event based on a comparison of the maximum pressure per current waveform within the interface volume and a containment pressure threshold for the interface volume. Containment pressure may be determined as described with regard to FIG. 4.

The gas penetrating into the interface between the conductive member and the decomposable member can be modeled with a pressure penetration interaction model that simulates a fluid penetrating into the interface. In some examples, the fluid may not be modeled directly, but rather implemented as a pressure boundary condition. The model may take into consideration an amount of force existing at the interface between the two materials and the pressure of the gas to determine whether the pressure is sufficient for gas to leak into the interface. Relating back to FIG. 3, the fluid contact is generating the breach of pressure at 340. When the fluid pressure reaches the edge of the head of the conductive member, a containment breach can be determined based on the mechanical equilibrium.

Figure 15:
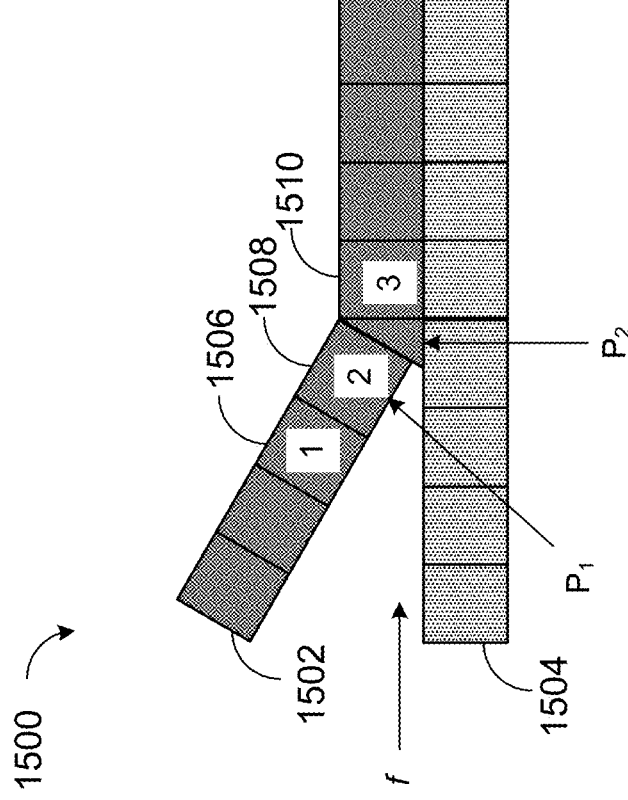
FIG. 15 schematically shows pressure penetration into an interface.

FIG. 15 shows a one-dimensional (1DIM) model 1500 of fluid penetration between conductive member 1502 and decomposable member 1504. Each of conductive member 1502 and decomposable member 1504 are divided into a plurality of nodes extending outward from the center of conductive member 1502. Three nodes (1506, 1508, and 1510, with three nodes shown, but more or fewer nodes may be included in other examples) of conductive member 1502 are annotated. Fluid pressure 1512 is indicated as penetrating between conductive member 1502 and decomposable member 1504.

Nodes may be labeled as open or closed, depending on whether the fluid pressure (f) has exceeded the critical pressure of the interface. When a node is indicated to be open (e.g., node 1506), the fluid pressure is also applied to nearest neighboring node(s) that is/are indicated to be closed. The total force exerted on an element is calculated using the nodal shape functions ($N_1$, $N_2$, $N_3$). In this example, $P_1=fN_1+fN_2$, and $P_2=fN_2$.

Figure 16:
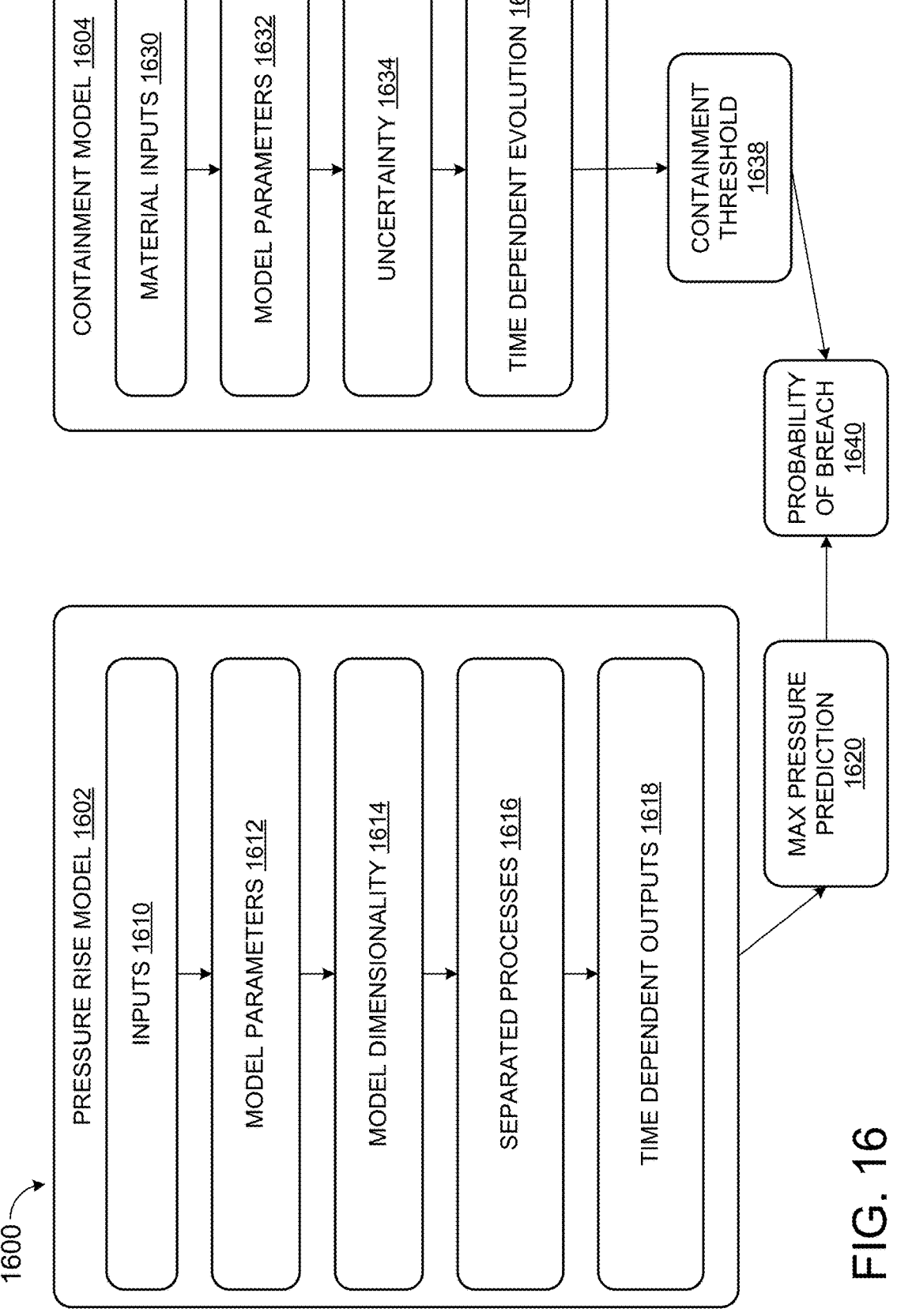
FIG. 16 schematically shows an integrated model for determining a probability of a breach at an interface between a conductive member and a decomposable member.

FIG. 16 schematically shows an integrated model 1600 for determining a probability of a breach at an interface between a conductive member and a decomposable member, such as a conductive fastener and a CFRP panel. Integrated model 1600 comprises a pressure rise model 1602 and a containment model 1604.

Pressure rise model 1602 comprises a plurality of inputs 1610. Inputs 1610 include material properties, such as those described with regard to FIG. 5, an input current waveform, such as a simulated lightning strike, joint geometry and configurations, and a contact resistance. Current waveform may be analytic or tabular. The contact resistance may in some examples be retrieved from a database or lookup table for the interface volume geometry and material properties of the decomposable member.

Inputs 1610 may inform model parameters 1612. Model parameters 1612 include a bulk resistance for the decomposable material, a total energy available from the current waveform, and a spatial evolution of the decomposable member.

Pressure rise model may further comprise a model dimensionality 1614, such as 0-dimensional, 1-dimensional, 2-dimensional, etc. Model dimensionality 1614 may inform how downstream calculations are performed, how the model evolves over time, etc.

Inputs 1610, model parameters 1612, and model dimensionality 1614 may be used in calculating separated processes 1616. Separated processes 1616 may include Joule heating of the decomposable material, phase change of the decomposable material, and the heating of gasses in the interface volume. The phase change of the decomposable material may inform the quantity and properties of volatile gasses within the interface volume. Mixing laws may inform the heating of a mixture of air and volatile gasses. Such mixing laws may be derived based on first-principles of thermodynamics. In addition to heating energy and decomposition, spatial energy transfer, e.g., thermal conduction, may be calculated, allowing for the creation of energy losses, conductive losses, etc.

Separated processes 1616 may be combined to determine time-dependent outputs 1618. Time-dependent outputs 1618 may include temperature rise, decomposition, and pressure rise over time. The pressure rise over time may then be used to determine a maximum pressure prediction 1620.

Containment model 1604 comprises a plurality of material inputs 1630. Material inputs may include material properties of the conductive member, the decomposable member, and the interface volume as described with regard to FIG. 5. Model parameters 1632 may include a range of pressures to be evaluated.

Uncertainty 1634 may include ranges of pre-load parameters, such as described with regard to FIG. 8A-8C, as well as ranges of values for material inputs 1630. Time-dependent evolution 1636 may include pressure over time and fluid penetration over time, as described with regard to FIG. 15. The output of time-dependent evolution 1636 may be a containment threshold 1638. As described with regard to FIG. 9, the containment threshold may be output as an S-curve with upper and lower bounds.

Max pressure prediction 1620 and containment threshold 1638 may then be compared, and a probability of breach 1640 output determined. Probability of breach 1640 may include one or more ranges of probability. Probability of breach 1640 ties the physics-based model of pressure rise model 1602 to the structural model of containment model 1604 to derive a mechanical response.

Figure 17:
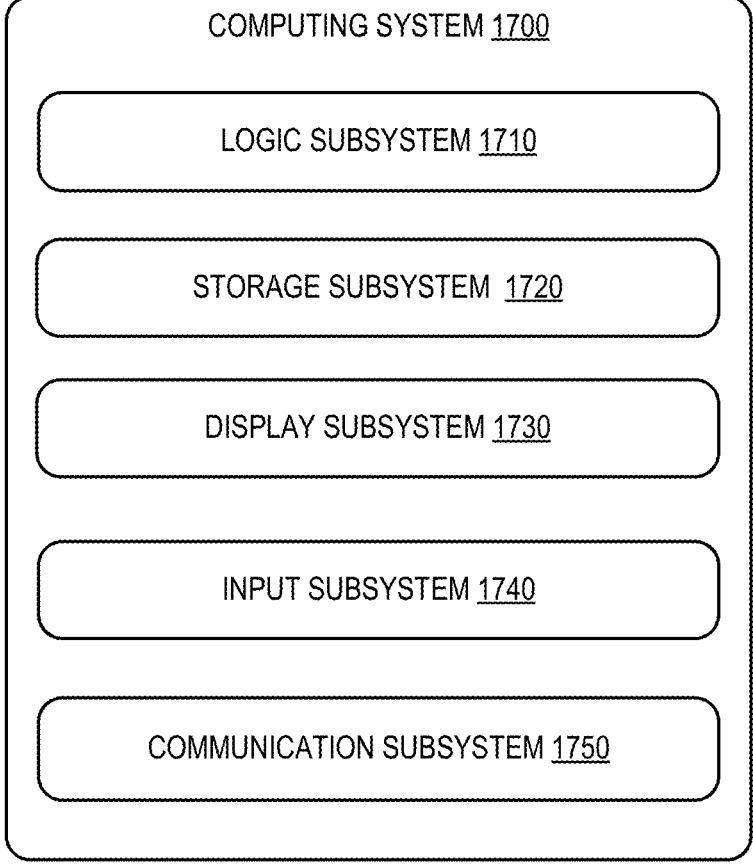
FIG. 17 schematically depicts an example computing system.

FIG. 17 schematically shows a simplified representation of a computing system 1700 configured to provide any to all of the compute functionality described herein. Computing system 1700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1700 includes a logic subsystem 1710 and a storage subsystem 1720. Computing system 1700 may optionally include a display subsystem 1730, input subsystem 1740, communication subsystem 1750, and/or other subsystems not shown in FIG. 17.

Logic subsystem 1710 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem may optionally be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1720 includes one or more physical devices configured to temporarily and/or permanently hold computer information such as data and instructions executable by the logic subsystem. When the storage subsystem includes two or more devices, the devices may be collocated and/or remotely located. Storage subsystem 1720 may include volatile, nonvolatile, dynamic, static, read/write, read-only, random-access, sequential-access, location-addressable, file-addressable, and/or content-addressable devices. Storage subsystem 1720 may include removable and/or built-in devices. When the logic subsystem executes instructions, the state of storage subsystem 1720 may be transformed—e.g., to hold different data.

Aspects of logic subsystem 1710 and storage subsystem 1720 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or supersegmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1730 may be used to present a visual representation of data held by storage subsystem 1720. This visual representation may take the form of a graphical user interface (GUI). Display subsystem 1730 may include one or more display devices utilizing virtually any type of technology. In some implementations, display subsystem may include one or more virtual-, augmented-, or mixed reality displays.

When included, input subsystem 1740 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1750 may be configured to communicatively couple computing system 1700 with one or more other computing devices. Communication subsystem 1750 may include wired and/or wireless communication devices compatible with one or more different communication protocols. The communication subsystem may be configured for communication via personal-, local- and/or wide-area networks.

Further, the disclosure comprises configurations according to the following clauses.

Clause 1. A method for determining a likelihood of an ignition hazard, comprising: receiving a current waveform for a lightning strike event at a conductive member that forms an interface with a decomposable member; receiving material parameter inputs for the conductive member and the decomposable member; and based at least on one or more of the received material parameter inputs and an energy from the current waveform: resolving a heating of the decomposable member following the lightning strike event; and determining a quantity of volatiles generated within the interface volume following the lightning strike event; determining a total pressure generation within the interface volume based on the resolved heating and the determined quantity of volatiles; and outputting a probability of ignition hazard by the lightning strike event based on a comparison of the total pressure generation and a containment pressure threshold for the interface volume.

Clause 2. The method of clause 1, wherein the material parameter inputs comprise one or more of an interface geometry, an interface volume, material properties of the conductive member and material properties of the decomposable member.

Clause 3. The method of clause 2, further comprising: receiving one or more of a contact resistance of the interface and a voltage across the interface; and determining one or more of the resolved heating of the decomposable member and the quantity of volatiles generated within the interface volume based on one or more of the contact resistance of the interface and the voltage across the interface.

Clause 4. The method of clauses 1 to 3, wherein the conductive member is a fastener, and wherein the containment pressure threshold for the interface volume is based on at least a fastener preload.

Clause 5. The method of clauses 1 to 4, wherein the fastener preload is determined based on at least a configuration of a joint of the fastener.

Clause 6. The method of clauses 1 to 5, wherein the fastener preload is further determined based on fluid pressure penetration into the joint of the fastener.

Clause 7. The method of clauses 1 to 6, wherein the probability of ignition hazard by the lightning strike event is further based on an uncertainty of a nut factor of the fastener.

Clause 8. The method of clauses 1 to 7, wherein the decomposable member comprises carbon-fiber reinforced plastic.

Clause 9. The method of clauses 1 to 8, wherein the total pressure generation within the interface volume is further based on a mixing of gaseous products with air within the interface volume.

Clause 10. A method for determining a likelihood of an ignition hazard, comprising: receiving a current waveform for a lightning strike event at a conductive member that forms an interface with a decomposable member comprising a series of adjacent nodes; receiving a first contact resistance for a first node of the decomposable member located adjacent to an interface volume; at a first time stamp, based at least on the first contact resistance, determining a first pressure within the interface volume; after determining that the first node is completely depleted, receiving a second contact resistance for a second node, adjacent to the first node; at a second time stamp, based at least on the second contact resistance, determining a second pressure within the interface volume; and determining a maximum pressure per current waveform within the interface volume based on at least the first pressure and the second pressure.

Clause 11. The method of clause 10, further comprising: outputting a probability of ignition hazard by the lightning strike event based on a comparison of the maximum pressure per current waveform within the interface volume and a containment pressure threshold for the interface volume.

Clause 12. The method of clause 11, further comprising: indicating a containment breach based on fluid pressure applied to at least the first and second nodes.

Clause 13. The method of clauses 10 to 12, wherein determining the first pressure and the second pressure are further based on a bulk resistance of the decomposable member.

Clause 14. The method of clauses 10 to 13, wherein the material properties of the decomposable member comprise at least a mass of each node and a specific heat capacity of each node.

Clause 15. The method of clauses 10 to 14, wherein determining the first pressure comprises at least resolving a heating of the decomposable member following the lightning strike event and determining a quantity of volatiles generated within the interface volume following the lightning strike event.

Clause 16. The method of clauses 10 to 15, wherein determining a maximum pressure per current waveform within the interface volume comprises determining a stopping point of a decomposition front responsive to depletion of energy of the current waveform.

Clause 17. The method of clauses 10 to 16, further comprising receiving additional contact resistances at a plurality of additional time stamps.

Clause 18. The method of clauses 10 to 17, wherein the decomposable member comprises carbon-fiber reinforced plastic.

Clause 19. A system for determining a likelihood of an ignition hazard, comprising: one or more processors; and one or more storage devices holding instructions executable by the one or more processors to: receive a current waveform for a lightning strike event at a conductive member that forms an interface with a decomposable member; receive material parameter inputs for the conductive member and the decomposable member; and based at least on one or more of the received material parameter inputs and an energy from the current waveform: resolve a heating of the decomposable member following the lightning strike event; and determine a quantity of volatiles generated within the interface volume following the lightning strike event; determine a total pressure generation within the interface volume based on the resolved heating and the determined quantity of volatiles; and output a probability of ignition hazard by the lightning strike event based on a comparison of the total pressure generation and a containment pressure threshold for the interface volume.

Clause 20. The system of clause 19, wherein instructions for determining a total pressure generation within the interface volume further comprise: receive one or more of a contact resistance of the interface and a voltage across the interface; and determine one or more of the resolved heating of the decomposable member and the quantity of volatiles generated within the interface volume based on one or more of the contact resistance of the interface and the voltage across the interface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for determining a likelihood of an ignition hazard, comprising:
  receiving a current waveform for a lightning strike event at a conductive member that forms an interface with a decomposable member;
  receiving material parameter inputs for the conductive member and the decomposable member; and
  based at least on one or more of the received material parameter inputs and further based on an energy from the current waveform:
    determining an amount of heating of the decomposable member following the lightning strike event, by at least determining an increase in a temperature of the decomposable member; and
    determining a quantity of volatiles generated within the interface volume following the lightning strike event;
    determining a total pressure generation within the interface volume based on the determined amount of heating and the determined quantity of volatiles; and
    outputting a probability of ignition hazard by the lightning strike event based on a comparison of the total pressure generation and a containment pressure threshold for the interface volume.

2. The method of claim 1, wherein the material parameter inputs comprise one or more of an interface geometry, an interface volume, material properties of the conductive member and material properties of the decomposable member.

3. The method of claim 1, further comprising:
  receiving one or more of a contact resistance of the interface and a voltage across the interface; and
  determining one or more of the determined amount of heating of the decomposable member and the quantity of volatiles generated within the interface volume based on one or more of the contact resistance of the interface and the voltage across the interface.

4. The method of claim 1, wherein the conductive member is a fastener, and wherein the containment pressure threshold for the interface volume is based on at least a fastener preload.

5. The method of claim 4, wherein the fastener preload is determined based on at least a configuration of a joint of the fastener.

6. The method of claim 5, wherein the fastener preload is further determined based on fluid pressure penetration into the joint of the fastener.

7. The method of claim 5, wherein the material parameter inputs include a range of values for a nut factor of the fastener and an uncertainty of the nut factor of the fastener, and wherein the fastener preload is further based on an uncertainty of the nut factor of the fastener.

8. The method of claim 1, wherein the decomposable member comprises carbon-fiber reinforced plastic.

9. The method of claim 1, wherein the total pressure generation within the interface volume is further based on a mixing of gaseous products with air within the interface volume.

10. A method for determining a likelihood of an ignition hazard, comprising:
  receiving a current waveform for a lightning strike event at a conductive member that forms an interface with a decomposable member, the decomposable member comprising a series of adjacent nodes that extend outward from the conductive member;
  receiving a first contact resistance for a first node of the decomposable member located adjacent to an interface volume;
  at a first time stamp, based at least on the first contact resistance, determining a first pressure within the interface volume;
  after determining that the first node is completely depleted, receiving a second contact resistance for a second node, adjacent to the first node;
  at a second time stamp, based at least on the second contact resistance, determining a second pressure within the interface volume; and
  determining a maximum pressure per current waveform within the interface volume based on at least the first pressure and the second pressure.

11. The method of claim 10, further comprising:
  outputting a probability of ignition hazard by the lightning strike event based on a comparison of the maximum pressure per current waveform within the interface volume and a containment pressure threshold for the interface volume.

12. The method of claim 11, further comprising: indicating a containment breach based on fluid pressure applied to at least the first and second nodes.

13. The method of claim 10, wherein determining the first pressure and the second pressure are further based on a bulk resistance of the decomposable member.

14. The method of claim 13, wherein the material properties of the decomposable member comprise at least a mass of each node and a specific heat capacity of each node.

15. The method of claim 10, wherein determining the first pressure comprises at least determining an amount of heating of the decomposable member following the lightning strike event by at least determining an increase in temperature of the decomposable member, and determining a quantity of volatiles generated within the interface volume following the lightning strike event.

16. The method of claim 10, wherein determining a maximum pressure per current waveform within the interface volume comprises determining a stopping point of a decomposition front responsive to depletion of energy of the current waveform.

17. The method of claim 10, further comprising receiving additional contact resistances at a plurality of additional time stamps.

18. The method of claim 10, wherein the decomposable member comprises carbon-fiber reinforced plastic.

19. A system for determining a likelihood of an ignition hazard, comprising:

one or more processors; and one or more storage devices holding instructions executable by the one or more processors to:

receive a current waveform for a lightning strike event at a conductive member that forms an interface with a decomposable member;

receive material parameter inputs for the conductive member and the decomposable member; and based at least on one or more of the received material parameter inputs and further based on an energy from the current waveform:

determining an amount of heating of the decomposable member following the lightning strike event, by at least determining an increase in a temperature of the decomposable member; and determine a quantity of volatiles generated within the interface volume following the lightning strike event;

determine a total pressure generation within the interface volume based on the determined amount of heating and the determined quantity of volatiles; and output a probability of ignition hazard by the lightning strike event based on a comparison of the total pressure generation and a containment pressure threshold for the interface volume.

20. The system of claim 19, wherein instructions for determining a total pressure generation within the interface volume further comprise:

receive one or more of a contact resistance of the interface and a voltage across the interface; and determine one or more of the determined amount of heating of the decomposable member and the quantity of volatiles generated within the interface volume based on one or more of the contact resistance of the interface and the voltage across the interface.

* * * * *